United States Patent [19]

Petro, IV

[11] Patent Number: 4,465,714
[45] Date of Patent: Aug. 14, 1984

[54] SEQUENTIALLY PULSED SPRAYING SYSTEM

[75] Inventor: John S. Petro, IV, Lakeland, Fla.

[73] Assignee: FMC Corporation, Chicago, Ill.

[21] Appl. No.: 407,200

[22] Filed: Aug. 11, 1982

[51] Int. Cl.³ .............................................. B05D 1/02
[52] U.S. Cl. ...................................... 427/424; 118/24; 118/313; 118/684; 118/685; 118/697; 118/698
[58] Field of Search ............... 118/684, 685, 698, 697, 118/302, 313, 314, 24; 427/424

[56] References Cited

U.S. PATENT DOCUMENTS

| | | | |
|---|---|---|---|
| 2,675,778 | 4/1954 | Peeps | 118/685 |
| 2,696,449 | 12/1954 | Ericks et al. | 118/302 |
| 2,804,764 | 9/1957 | Ruton | 118/684 X |
| 3,107,183 | 10/1963 | Way et al. | 118/313 |
| 3,477,870 | 11/1969 | Boretti et al. | 118/302 X |
| 4,142,684 | 3/1979 | Schweitzer | 118/302 |

Primary Examiner—Shrive P. Beck
Attorney, Agent, or Firm—Louis J. Pizzanelli; Richard B. Megley

[57] ABSTRACT

Articles such as fruit on a conveyor are spray coated with liquid wax from a transverse row of sequentially pulsed spray nozzles controlled by microcomputer signals to solenoid nozzle valves. The computer is programmed to receive inputs from operator controlled panel switches which can be set to select the number of nozzles in the row; an excursion time during which all nozzles in a row spray and a pulse time during which one nozzle sprays. The computer limits the nozzle pulse time to dwell time equal to the quotient of the number of nozzles and the pulse time. The nozzles are automatically cleaned out by compressed air if the supply of fruit to the conveyor is interrupted for a predetermined period of time.

16 Claims, 22 Drawing Figures

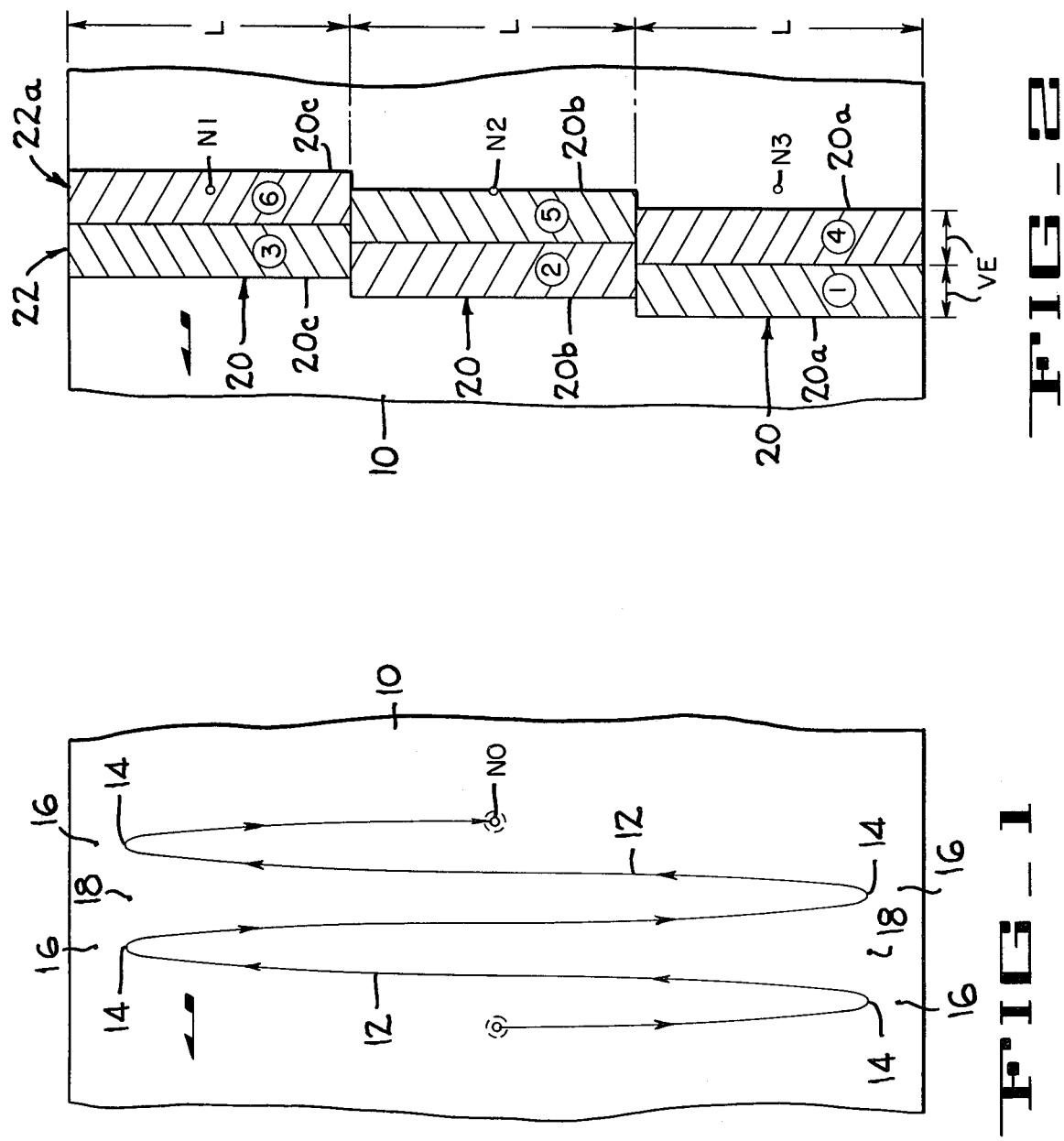

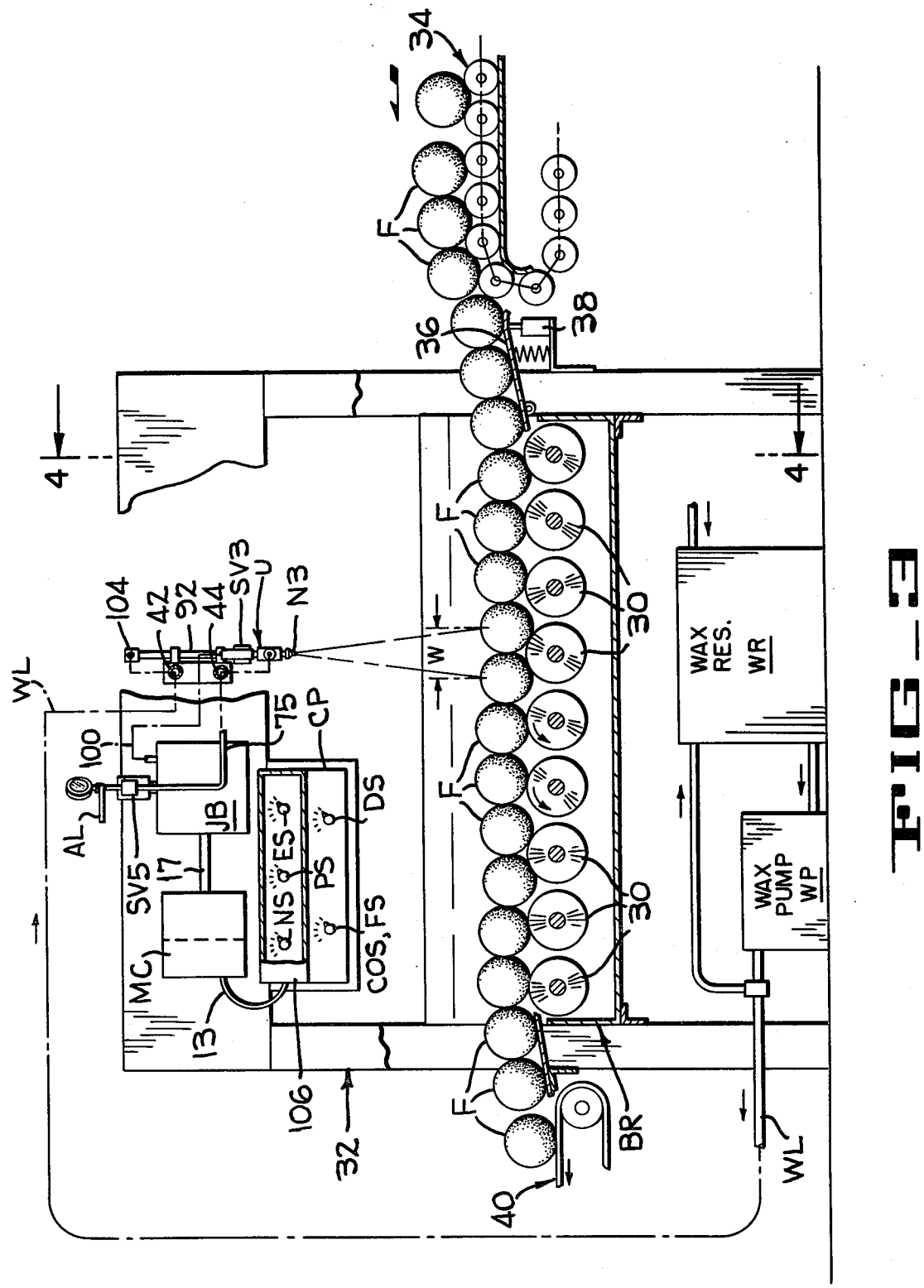

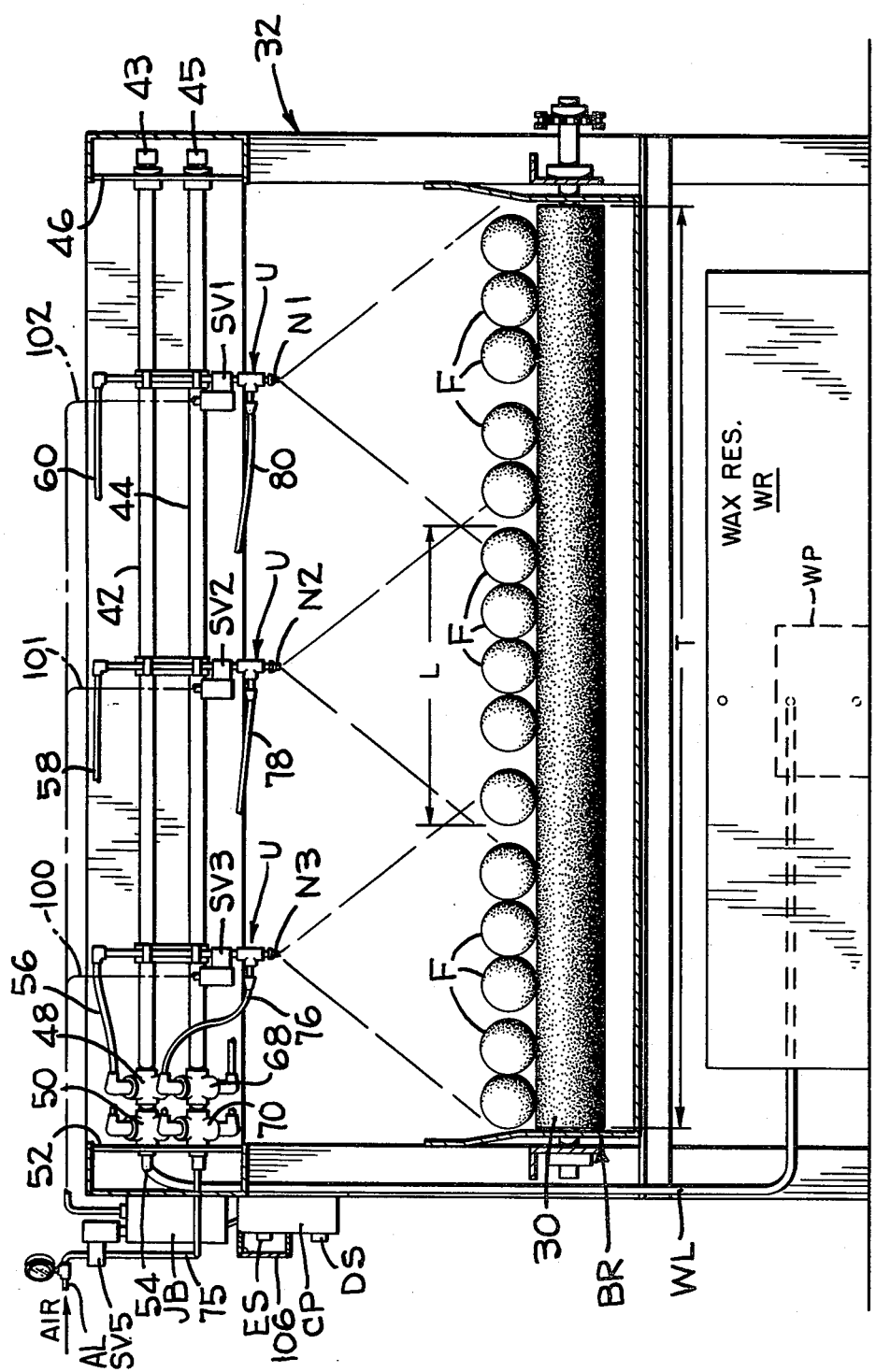

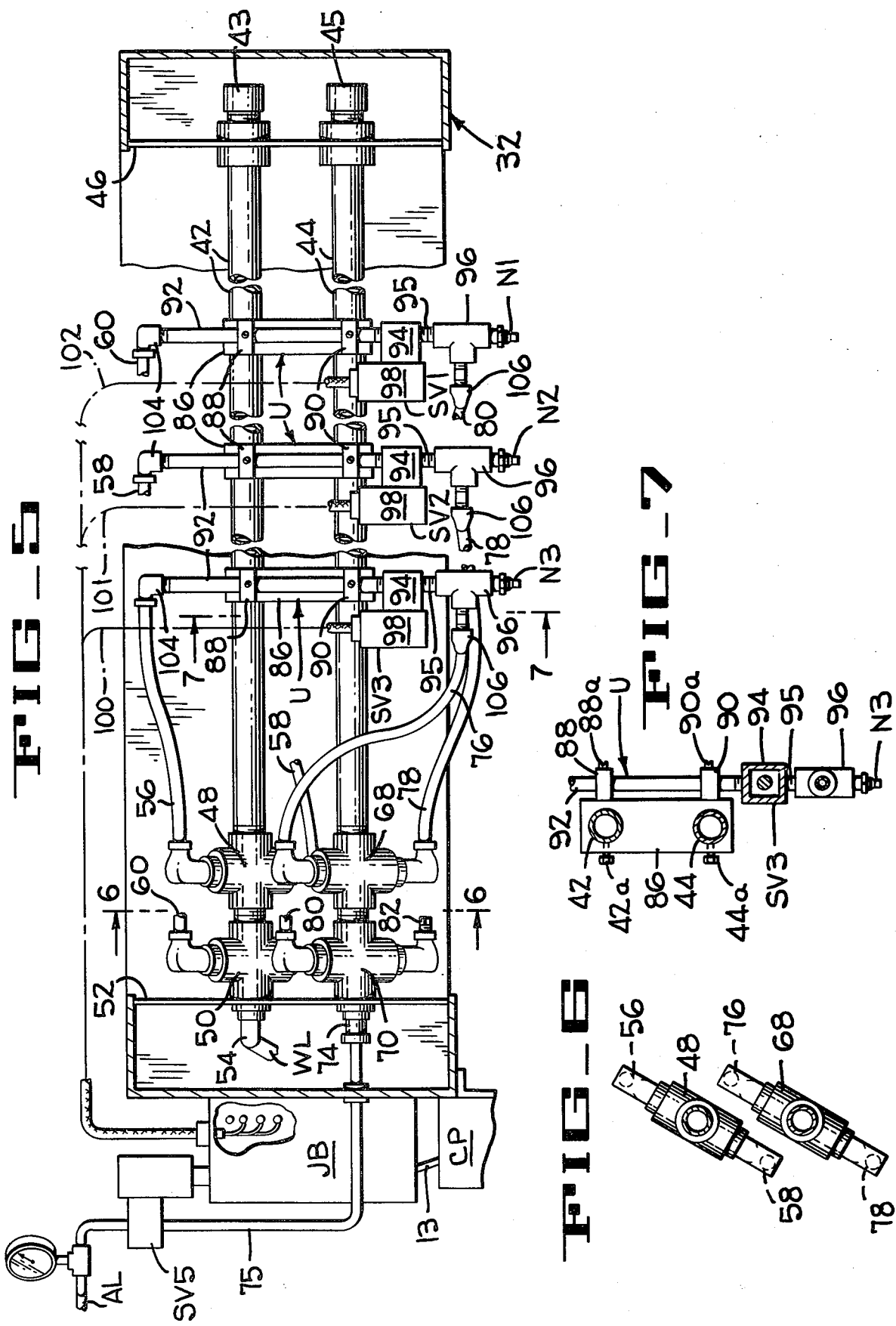

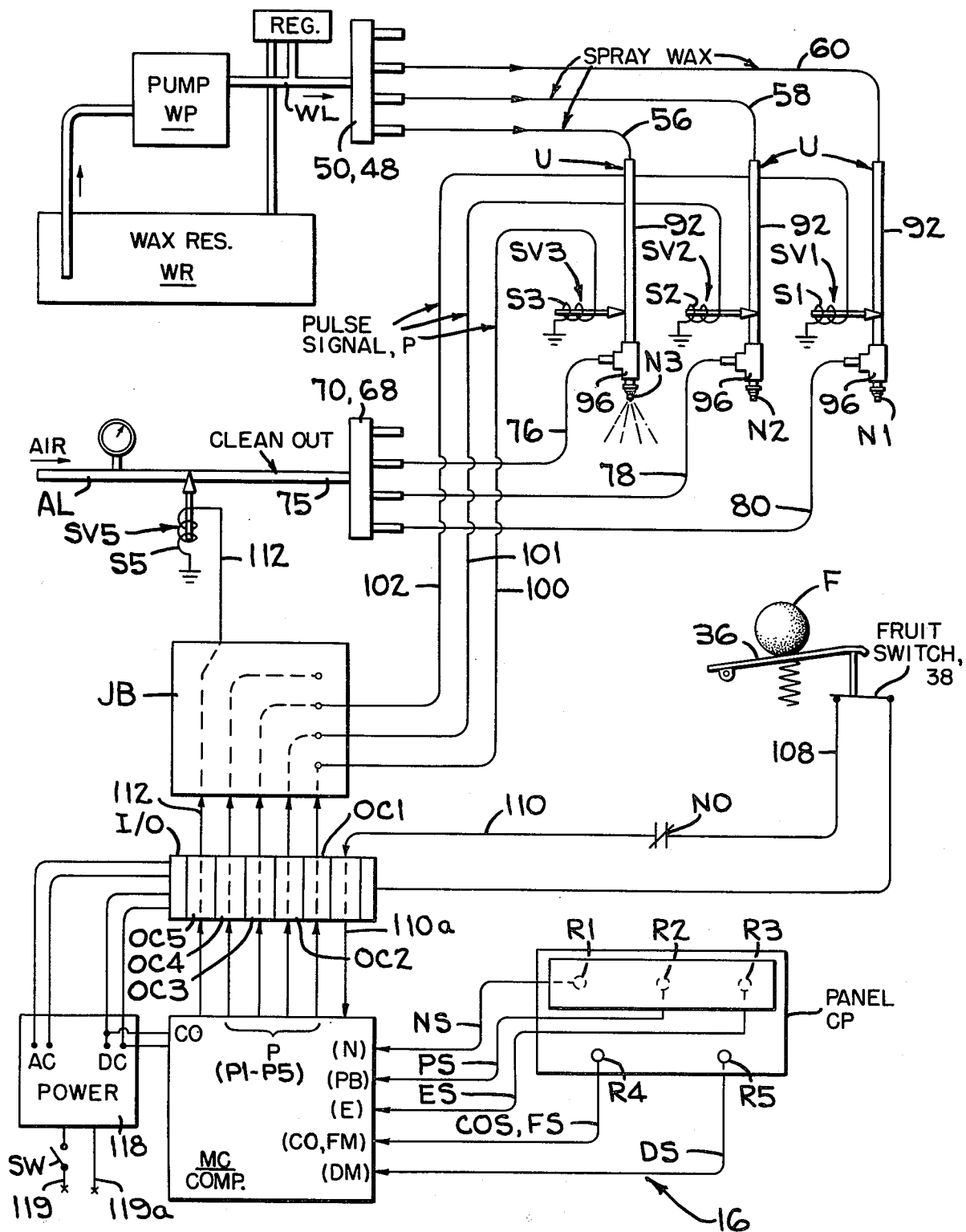

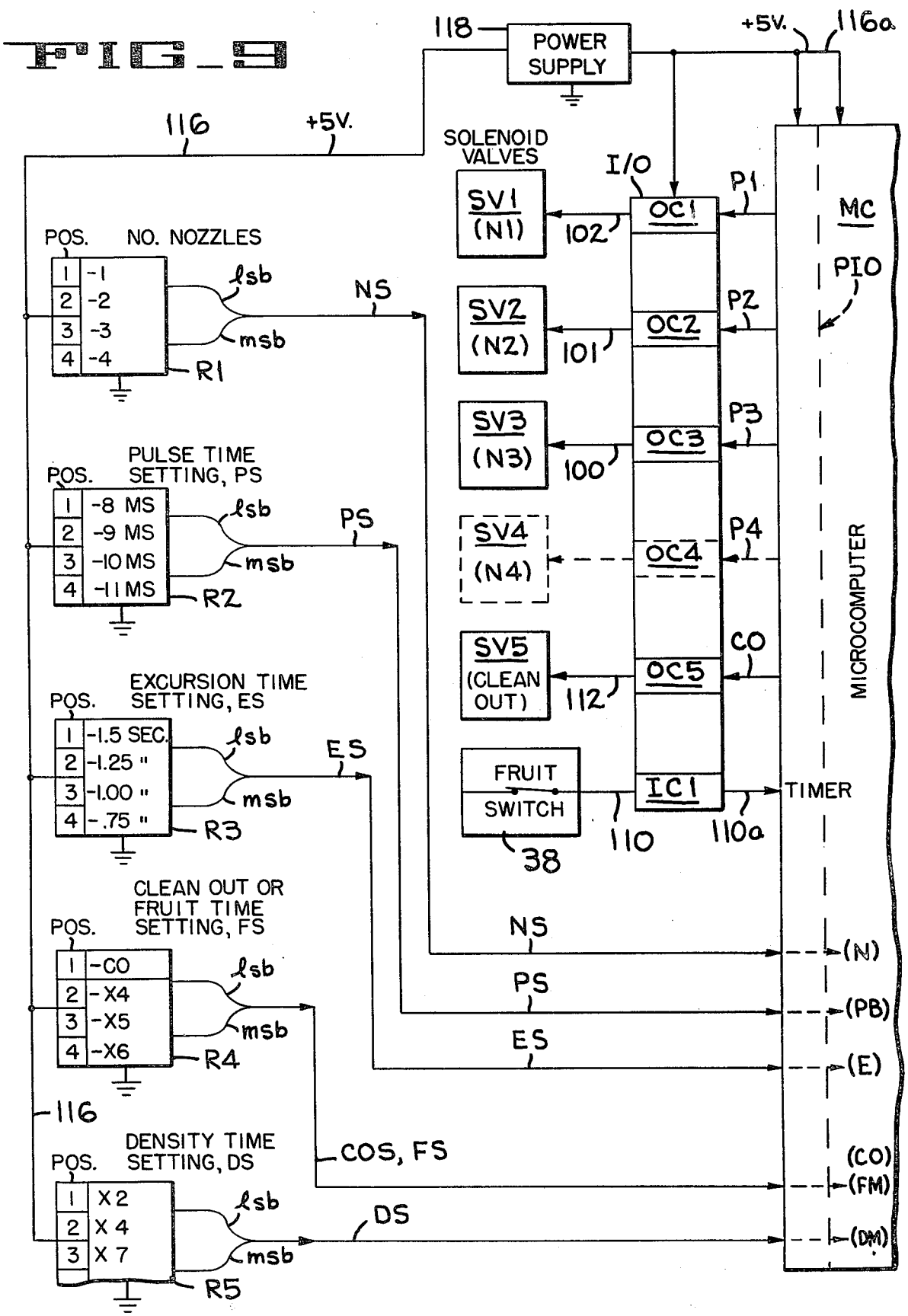

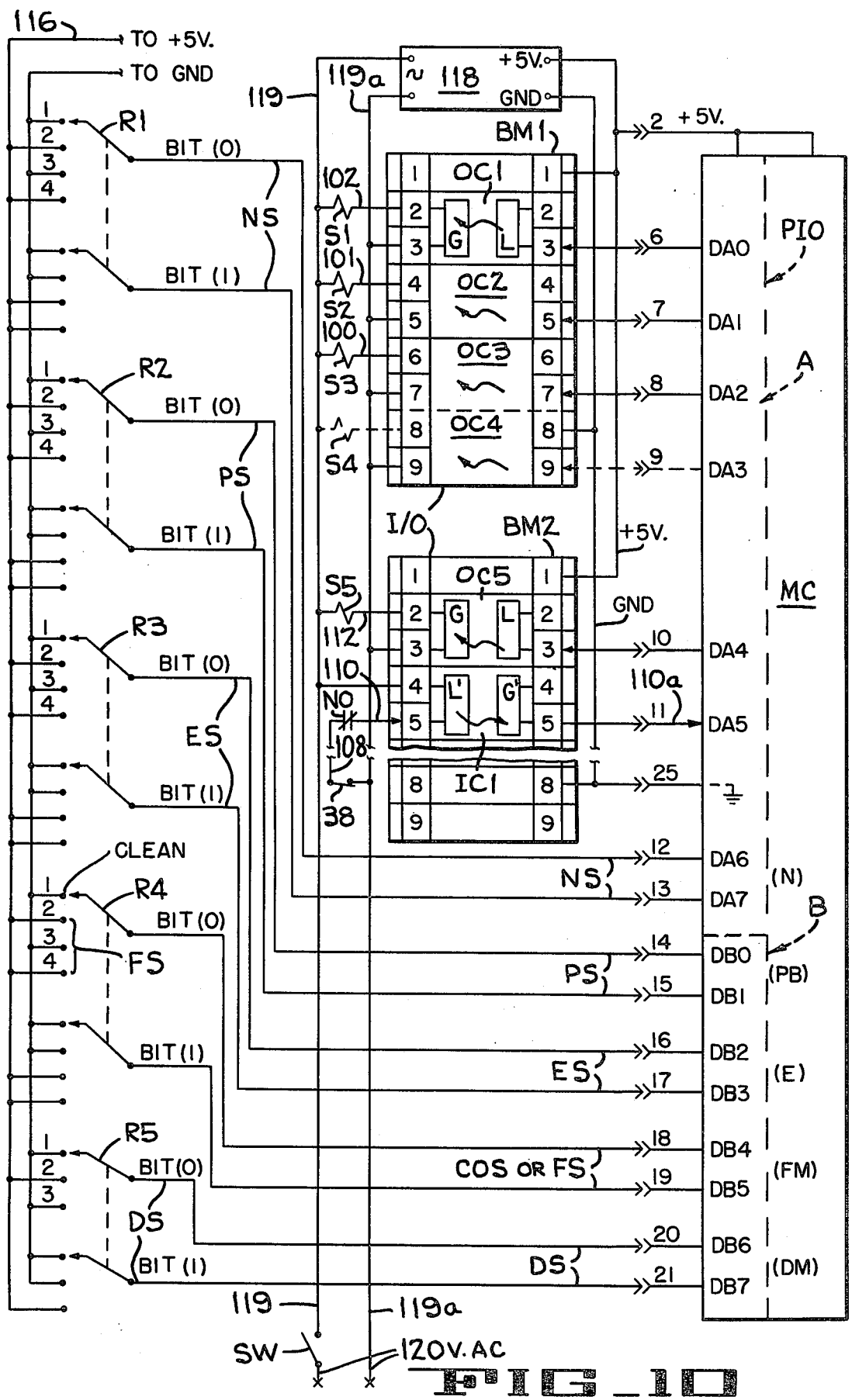
FIG_10

FIG_11
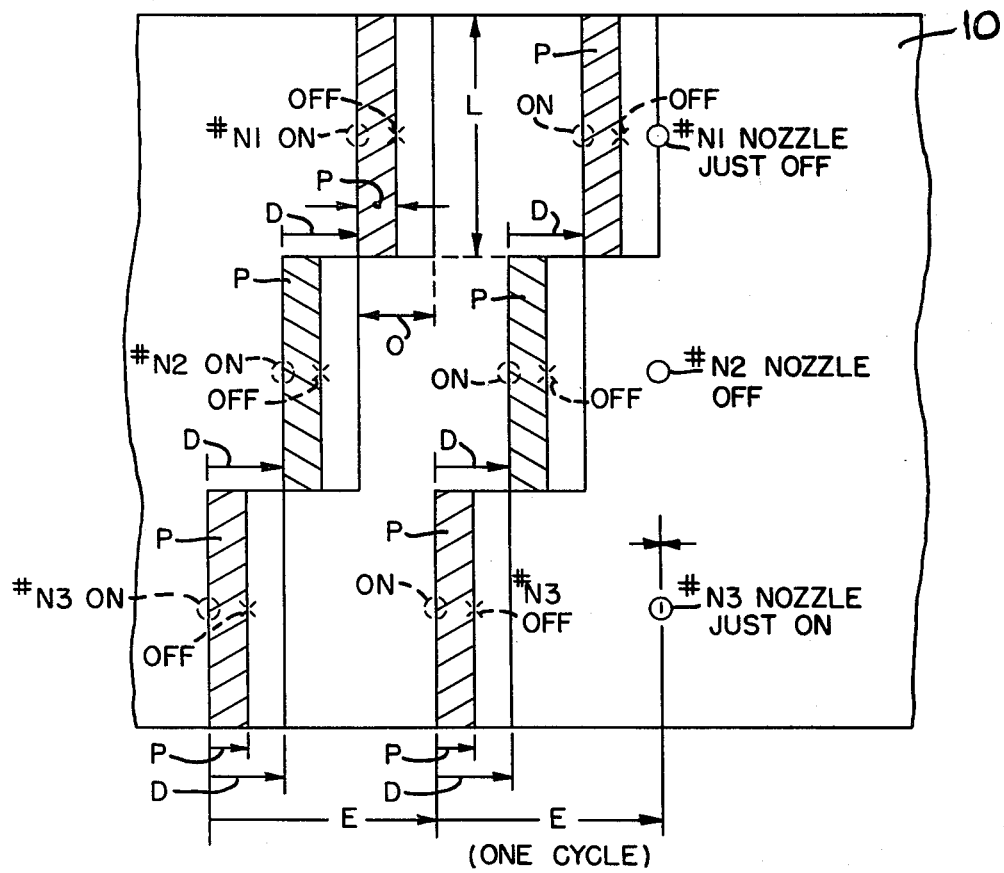
FIG_11A
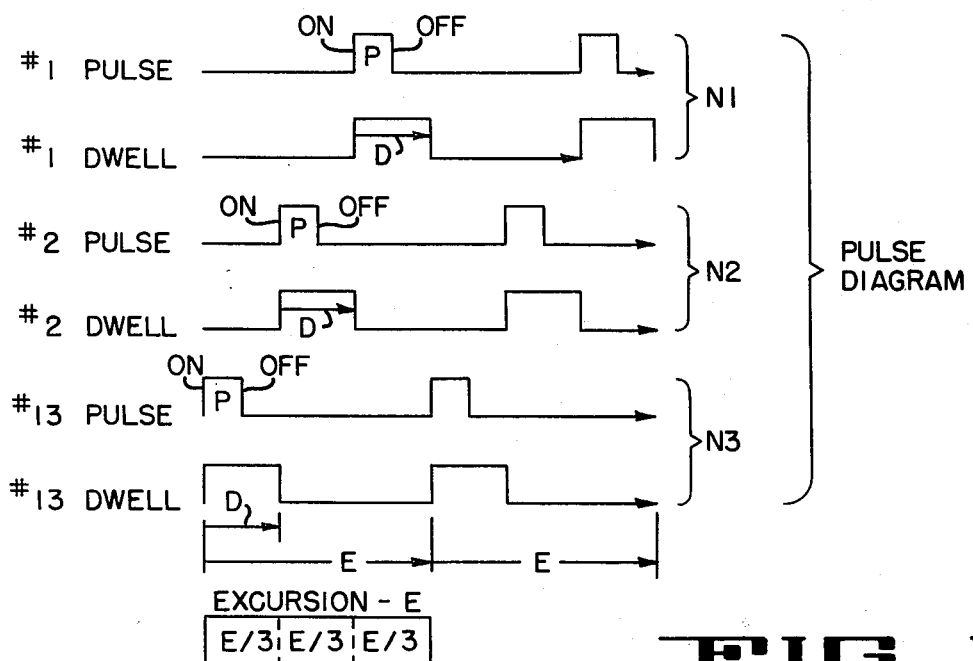

FIG_12

NOMENCLATURE

BASIC DATA
- U   UNIT OF LENGTH
- Fd   FRUIT DIAMETER, U
- W   LONGITUDINAL WIDTH OF SPRAY, U
- V   VELOCITY OF FRUIT, U/MILLISECOND

SWITCH SETTINGS
- R1   NUMBER OF NOZZLES SETTING, NS (FACTORY)
- R3   EXCURSION TIME SETTING, ES (FACTORY)
- R2   PULSE TIME SETTING, PS (FACTORY)
- R4   FRUIT TIME SETTING, FS (OPERATOR)
- R5   DENSITY TIME SETTING, DS (OPERATOR)

DATA FROM SETTINGS
- N   NUMBER OF NOZZLES
- E   EXCURSION TIME. CYCLE TIME FOR ONE SET OF NOZZLES, MILLISECONDS. (1500, 1200, 1000 OR 750 M.S.)
- PB   PULSE TIME BASE (8, 9, 10 OR 11 M.S.)
- FM   FRUIT TIME MULTIPLIER (x4, x5 OR x6)
- DM   DENSITY TIME MULTIPLIER (x2, x4 OR x7)

COMPUTED FROM DATA
- P   PULSE TIME, SPRAY TIME PER NOZZLE, MS. ($P = PB \times FM \times DM$) $P \leq D$
- D   DWELL TIME MAXIMUM SPRAY TIME PER NOZZLE, MS. ($D = E/N$)

FOR ILLUSTRATION
- VE   $V \times E$ = FRUIT TRAVEL DURING EXCURSION TIME E, UNITS U. ($VE \cong Fd$)
- VP   $V \times P$ = FRUIT TRAVEL DURING PULSE TIME P, UNITS U. (VP SHOULD = VE−W)
- VD   $V \times D$ = FRUIT TRAVEL DURING DWELL TIME D, UNITS U.

DATA EXAMPLE
ASSUME VE = FRUIT DIAMETER.
ASSUME E = Fd/V MS
IDEALLY, VP = VE−W = Fd−W IN UNITS U
SO P SHOULD = VP/V = $\dfrac{VE-W}{V}$

EXAMPLE

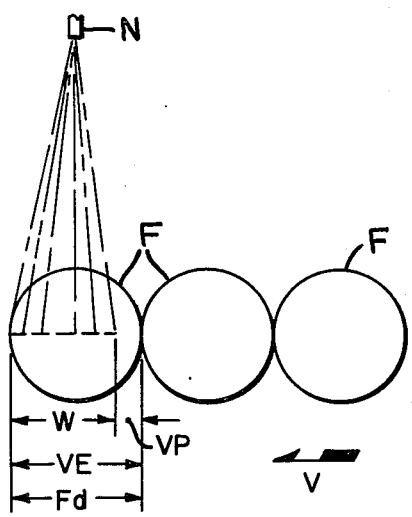

FIG_12A

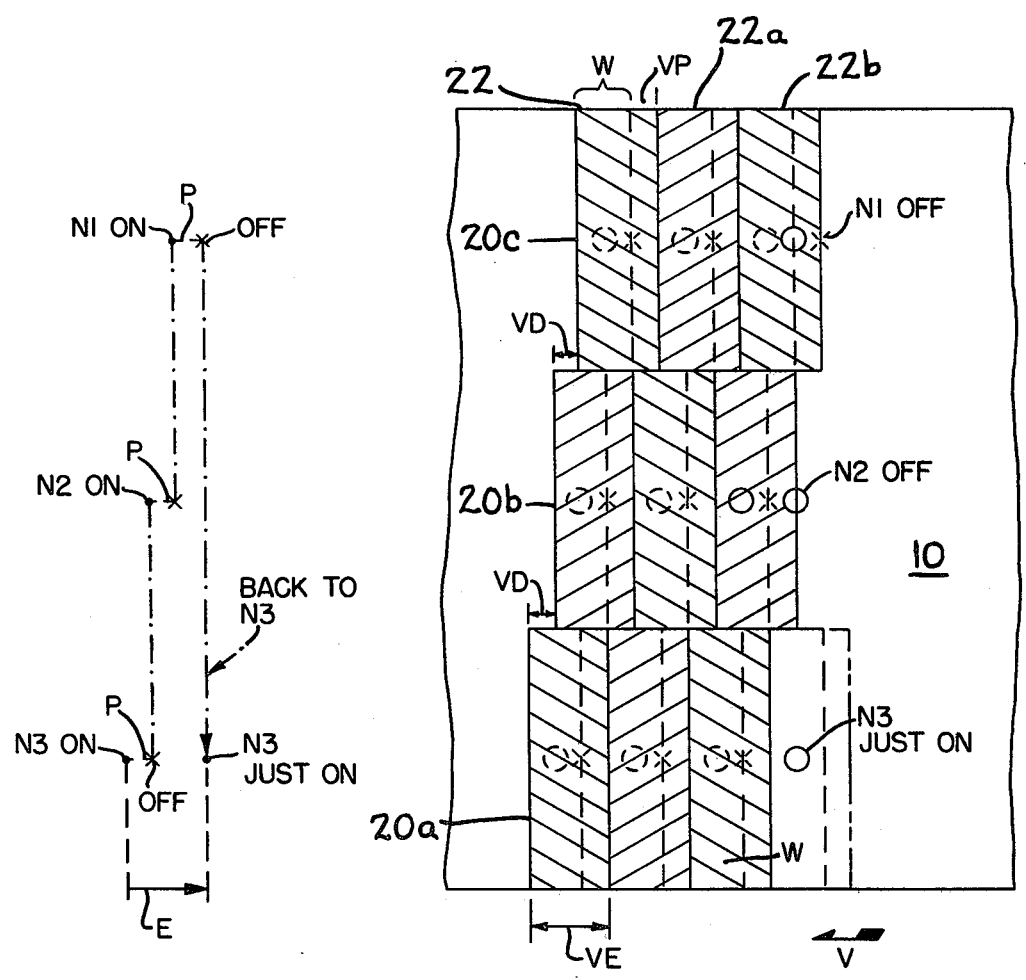
FIG_13A  FIG_13

SPECIFIC DATA EXAMPLE $U = \dashv \cdot \vdash$ UNIT OF LENGTH

| | |
|---|---|
| FRUIT DIAMETER | $Fd = 4\ 1/2" = 9U$ |
| CONVEYOR SPEED | $V = 4\ 1/2"/SEC = 9/1000\ U/SEC$ |
| SPRAY WIDTH | $W = 3" = 6U$ |
| NUMBER OF NOZZLES | $N = 3$ |
| ES, SWITCH RS-3 | $E = 1.0\ SEC = 1000\ MS = $ IDEALLY $Fd/V$ |
| D, COMPUTED | $D = E/3 = 333\ MS$ |
| P, COMPUTED | $P = D = 333\ MS$ |
| SCALED ON FIGURE | $VE = V \times E = 9/1000 \times 1000 = 9U$ |
| | $VD = V \times D = 9/1000 \times 333 = 3U$ |
| | $VP = V \times P = 9/1000 \times 333 = 3U$ |

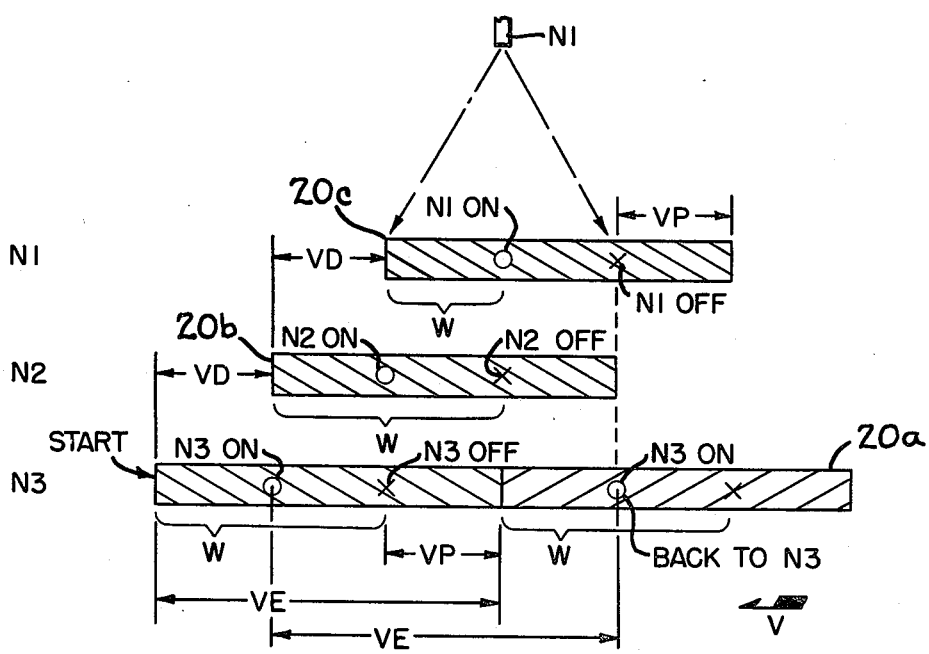

COMPUTATION OF P

EXCURSION E (ES) = 1000 MS, D = E/3 = 333 MS.
PULSE BASE PB (PS) = 8 MS, OPERATOR SETS FS (FM) = 6, DS (DM) = 7.
P, COMPUTED = PB × FM × DM.

PB  FM  DM
P, COMPUTED = 8 × 6 × 7 = 336 MS.*
*SINCE P ≦ D AND SINCE 336 > 333, COMPUTER TRUNCATES P TO 333 MS.

FIG_14

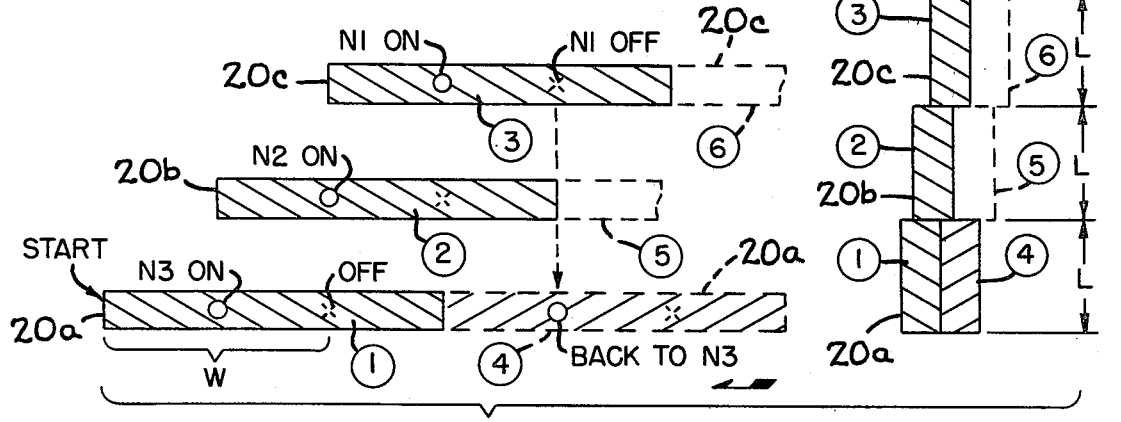
FIG_14A
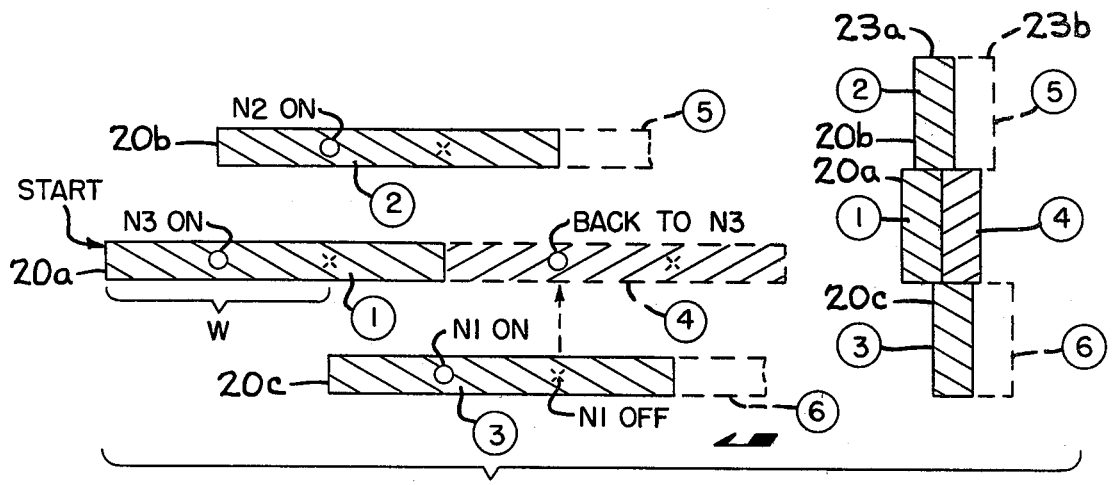
FIG_14B
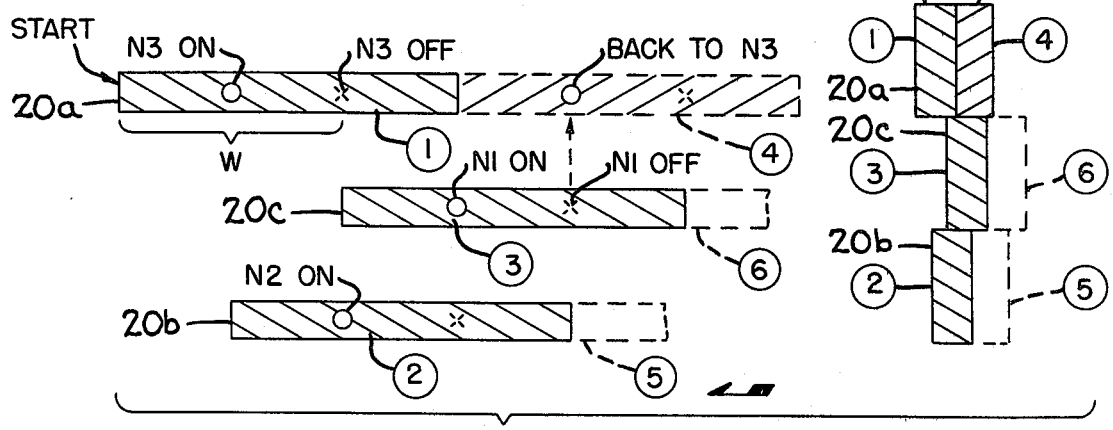
FIG_14C

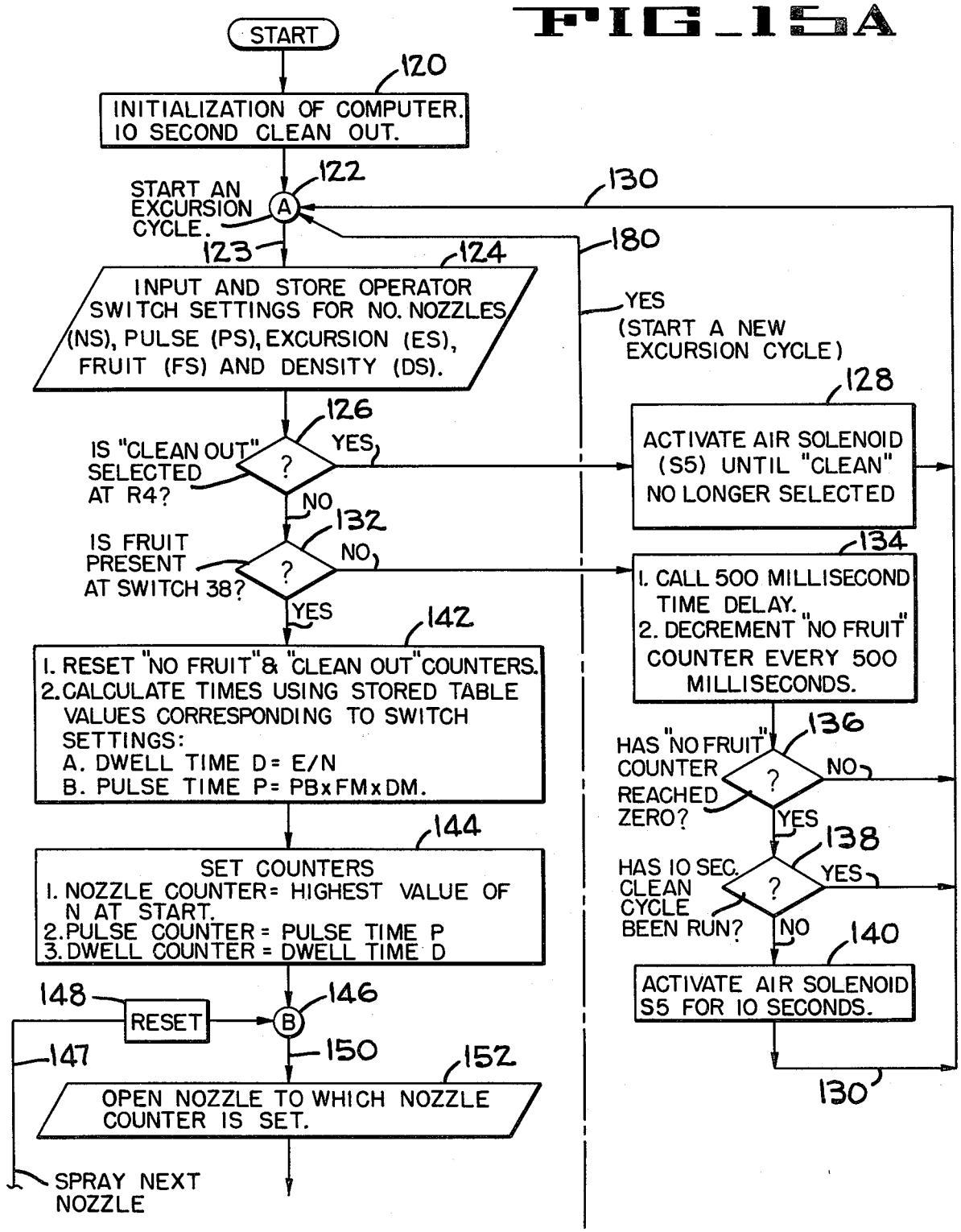

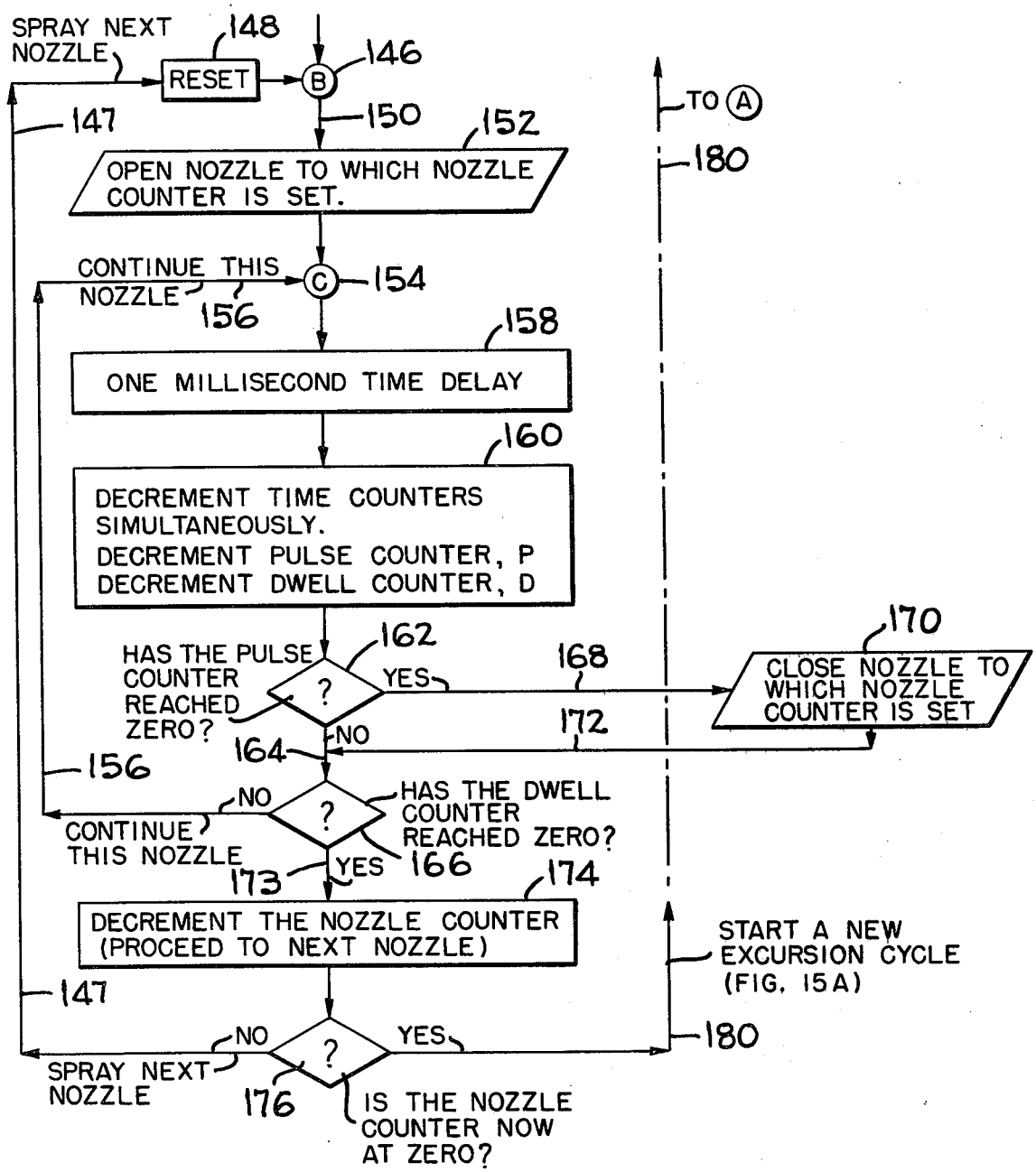
FIG_15B

SEQUENTIALLY PULSED SPRAYING SYSTEM

BACKGROUND OF THE INVENTION

1. Field of the Invention

This invention relates to coating articles with a liquid and more particularly to a system for spraying a liquid wax coating onto a moving stream of fruit, vegetables or the like.

2. Description of the Prior Art

Prior fruit coating systems spray a liquid wax coating onto a layer or stream of fruit as the fruit is conveyed beneath a single spray nozzle. The nozzle is moved transversely back and forth across the moving stream of fruit and sprays continuously during its back and forth motion. The resultant spray pattern provides doubly sprayed zones alternating with lightly sprayed zones along both sides of the moving surface. In order to provide a uniform density, large area spray pattern air under pressure is directed into and mixed with the liquid stream emerging from the nozzle.

When spraying volatile liquids, such as the liquid wax coating for fruit employed in the preferred embodiment of the invention, the mixing of a stream of pressurized air with the liquid (as required by a single large nozzle) may have undesired effects. For example, when using a "pneumatic" spray, the liquid may dry before the impact with the surface. This renders the coating on the fruit translucent and visible (fogging) instead of transparent. Furthermore, the mixing of air at the nozzle requires additional piping to the nozzle and careful nozzle adjustment. It also requires the use of a vapor collecting hood to protect operating personnel. Furthermore, mechanical systems for rapidly traversing the nozzle requires frequent replacement of worn parts during prolong continuous service.

The patent to Gerwe et al U.S. Pat. No. 2,866,709, Dec. 30, 1958, assigned to the assignee of the present invention, discloses a method of treating peaches wherein the fruit is supported on a brush bed and is sprayed by a row of fixed nozzles controlled by a common valve. No sequential nozzle operation is disclosed. When all the nozzles in a row of nozzles were turned on to spray simultaneously, the flow of wax to the nozzle manifold would require adjustment in accordance with the number of nozzles in a row.

SUMMARY OF THE INVENTION

Briefly, the system of the present invention sequentially sprays from each nozzle in a row of fixed nozzles mounted above the moving surface to be sprayed. Valves for the nozzles are sequentially activated or "pulsed" so that each nozzle in the row sprays once during an "excursion" spray cycle. Upon completion of the time allotted for each pulse spray on one nozzle, the system initiates a pulse spray for the next nozzle substantially instantaneously and thus provides a uniform continuous spray coating on the underlying moving surface such as a stream or bed of moving fruit.

More specifically, in the system of the present invention a number of nozzles is selected. The nozzles are adjustably mounted in a row above the support for a longitudinally moving stream of fruit or the like. Each nozzle in the row is connected to a source of liquid under pressure through a remotely controlled valve disposed adjacent the nozzle. Controls enable an operator to set in a nozzle excursion time for a row of nozzles and a pulse time for a single nozzle. If fruit is sprayed, the excursion time is approximately equal to the time required for the fruit to advance by a distance equal to the average fruit diameter. The control system opens and closes (pulses) the valve for each nozzle in the row once during the pre-set excursion time to thereby provide a staggered band deposit across the moving surfaces of the fruit. The pulse spray time for each individual nozzle is selected so that successive spray patterns from the same nozzle are contiguous.

Upon completion of each spray cycle the control system substantially instantaneously initiates a new spray cycle by closing the valve of the nozzle which has just sprayed and by opening the valve for the next nozzle. Successive, transverse "staggered" bands of coating liquid are thus sprayed onto the moving surface (such as a stream of fruit or the like) passing beneath the row of nozzles. The staggered bands interfit one another to form a continuous full width spray pattern of uniform density.

Another feature of the present invention relates to the prevention of non-productive spraying. The nozzles are automatically shut off when no surface, (e.g., no fruit) to be sprayed is passing beneath the nozzles. However, interruption of spraying for a substantial time could cause nozzle clogging by congealed liquid. In accordance with the present invention, a short time after the absence of a surface to be sprayed (e.g. fruit) is detected, all nozzle liquid valves are closed and a master clean out air valve is opened for cleaning out any liquid remaining in one or all of the nozzles. If the liquid valves for the nozzles were merely held closed without clean out until a new unsprayed surface (e.g. fruit) arrived, the liquid could congeal and clog the nozzles before a new batch of fruit appeared.

In the preferred embodiment of the invention to be described in detail herein, the system is employed to coat a moving layer or stream of discrete articles, such as citrus fruit, with a liquid wax and fungicide mixture. The fruit is moved along a rotary brush bed of known design during the spraying operation. A typical brush bed is disclosed in the patent to Kalmar U.S. Pat. No. 3,818,859.

Spray nozzles are mounted above the brush bed in a transverse row. The number of nozzles is selected to provide a full transverse deposit in the form of a staggered band that extends entirely across the brush bed which supports the fruit. Each individual nozzle is movable to and secured at the optimum lateral position across the bed, for providing a transversely continuous band.

In the preferred embodiment of the invention the control system includes a microcomputer which is programmed to act on various control inputs set in manually for a given installation. These inputs include settings for the number of spray nozzles in the row, a selected excursion time for the row, pulse time settings for a nozzle and other inputs to be described. Based on these inputs, the computer sequentially operates the individual spray nozzle valves. During operation, the computer instantaneously signals for initiation of a succeeding spray cycle upon elapse of the time allotted for the preceding spray cycle. These substantially instantaneous transfers of nozzle operation signals from nozzle to nozzle make it possible to provide precisely interfitted successive staggered bands or spray patterns from excursion spray cycle to excursion spray cycle.

If a product sensor indicates failure of the conveying system to deliver the product to be sprayed, the microcomputer automatically opens an air clean out valve after expiration of a predetermined time delay.

To summarize, the pulsed spray system of the present invention has the following advantages:

(1) Precision spraying, reduction in spray liquid requirements,
(2) Fixed nozzles, no traversing mechanism required.
(3) Low maintenance, long service before parts replacement;
(4) Large nozzles not required;
(5) No air stream required, no fogging or blooming;
(6) System easily and rapidly set up to fit a range of operating conditions, including
 (a) width of moving surface or fruit bed,
 (b) velocity of moving surface of fruit bed,
 (c) spray density liquid viscosity;
(7) Low manufacturing cost.

The manner in which the aforesaid features and advantages are attained will be apparent to those skilled in the art from the following detailed description of a preferred embodiment of the invention.

BRIEF DESCRIPTION OF THE DRAWINGS

FIG. 1 is a diagram of the nozzle path of a traversing nozzle system.

FIG. 2 shows a spray pattern for the system of the present invention.

FIG. 3 is a side elevation of the system with portions being broken away.

FIG. 4 is a section taken on line 4—4 of FIG. 3.

FIG. 5 is an enlarged section showing the wax and air manifold systems.

FIG. 6 is a fragmentary section taken on line 6—6 of FIG. 5.

FIG. 7 is a fragmentary section taken on line 7—7 of FIG. 5.

FIG. 8 is a schematic diagram of a system embodying the invention.

FIG. 9 is a simplified wiring diagram of the system.

FIG. 10 is a more detailed wiring diagram of an exemplary microcomputer system.

FIG. 11 is a diagram illustrating the spraying time pattern in plan.

FIG. 11A is a pulse timing diagram corresponding to the pattern of FIG. 11.

FIG. 12 is a table defining and illustrating nomenclature.

FIG. 12A is a diagram illustrating certain elements defined in FIG. 12.

FIG. 13 is a spray pattern diagram like that of FIG. 2 showing the spray pattern for a selected example of the system operation.

FIG. 13A is a highly simplified timing diagram corresponding to the pattern of FIG. 13.

FIG. 14 is an illustrative example of data and switch settings for a system providing the spray pattern of FIG. 13.

FIGS. 14A, 14B and 14C are diagrams like that of FIG. 14 showing three equivalent nozzle numbering conventions.

FIGS. 15A and 15B constitute a simplified program flow chart for a microcomputer control system embodying the invention.

DESCRIPTION OF THE PREFERRED EMBODIMENT

Traversing Nozzle Pattern

The diagram of FIG. 1 shows the nozzle path for prior traversing nozzle systems. The traversing nozzle NO is swung transversely across the moving surface 10 by a harmonic drive. The nozzle path 12, which will be traced on the moving surface 10, is a sine type curve. The transverse velocity of the nozzle decreases to 0 and accelerates at spaced zones 14 along each side of the moving surface 10.

The spray pattern resulting from the nozzle path 12 does not cover the surface 10 with a coating of uniform density. The pattern overlaps at longitudinally spaced zones 16 along the edges of the surface and provides less dense sprayed areas at alternate zones 18.

Spray Pattern of the Invention

The diagram of FIG. 2 illustrates the spray pattern of the system of the present invention after the completion of two excursion spray cycles. Three nozzles, N3, N2 and N1 are mounted in fixed positions to form a row of nozzles extending transversely across the moving surface 10 to be sprayed. Each nozzle deposits a rectangular spray pattern indicated generally at 20. Nozzle N3 deposits pattern 20a, nozzle N2 deposits pattern 20b and nozzle N3 deposits 20c. The longitudinal dimensions or widths VE of all patterns are basically equal and the laterally adjacent patterns are edge to edge. Each pattern has the same transverse length L.

The circled numbers in the patterns indicate a selected spraying time sequence. For example, in FIG. 2 nozzle N3 sprayed first (pattern 20a), nozzle N2 sprayed second (pattern 20b) and nozzle N1 sprayed third (pattern 20c). This completed one excursion spray cycle. The edge to edge patterns 20a, 20b and 20c form a band 22 across the surface 10 which is referred to as a "staggered band" and that terminology is adopted herein by definition.

Upon completion of the excursion spray cycle that produced the band 22, the signal for spray pattern No. 4 is applied to nozzle N3. Patterns No. 5 and 6 follow to form a second staggered band 22a which interfits the first band 22 without overlapping and with no gaps. A coated surface of uniform density is thus provided by the system of the present invention because the control system can actuate a new nozzle for spraying substantially instantaneously after elapse of the time allotted to a previous nozzle, as will be seen presently.

Basic System

Referring to FIGS. 3 and 4, a moving stream of fruit F is sprayed by a liquid mixture of wax and a fungicide, such as the mixture described in the patent to Kalmar U.S. Pat. No. 4,006,259, Feb. 1, 1977 and assigned to the assignee of the present invention. Spray liquid is drawn from a wax reservoir WR by a wax pump WP and delivered by a wax line WL to spray nozzles N3, N2 and N1, under control of solenoid valves SV3, SV2 and SV1. The solenoid valves are sequentially operated by control signals from a microcomputer MC via a junction box JB and in response to data set in at a control panel CP. The nozzles can be cleaned by air under pressure from an air line AL controlled by a solenoid clean out valve SV5.

Control data signals from a control panel CP (FIG. 3) are conducted by a cable 13 to the control microcomputer MC and the latter sends electrical control signals via a cable 17 to various solenoid valves in the system.

Preferred Construction

FIGS. 3-7 disclose in semi-diagrammatic form the construction of a preferred embodiment of the system of the present invention arranged for spraying citrus fruit F, such as oranges or the like. The fruits F are supported by a brush bed device BR as they are advanced beneath the row of three liquid spray nozzles N3, N2 and N1. The number of nozzles is selected in accordance with the transverse dimension T of the brush bed (FIG. 4). The transverse lengths L of each spray pattern 20 add up to the dimension T for full coverage across the brush bed BR.

The fruits F are supported on and moved across a bed of rotating brushes 30 in a known manner described in the aforesaid patent to Gerwe et al U.S. Pat. No. 2,866,709. The brushes 30 are all supported in framework 32 and are all rotated in the same direction by a known drive mechanism.

Fruit is delivered to and pushed along the brushes 30 by a live roller delivery conveyor 34 of known design, such as the conveyor shown in the patent to Ahlburg U.S. Pat. No. 3,068,785, Dec. 18, 1962. As the stream of fruit is forced onto the brush bed BR fruit passes across a hinged, spring loaded feed chute 36 which operates a fruit switch 38. As will be seen, when no fruit is on the feed chute 36 a nozzle clean out cycle is initiated after a predetermined time delay.

As fruits F pass beneath the spray nozzles they are sprayed by sequential operation of the nozzles. The rotating brushes 30 turn the fruit. The brushes also receive spray liquid and assist in coating the fruit by wiping the fruit with a spray liquid in a known manner. The coated fruit is removed from the brush bed BR by a take away conveyor 40 (FIG. 3).

Nozzles and Conduits

In the embodiment illustrated in FIG. 4, three spray nozzles N3, N2 and N1 are adjustably mounted above the bed of brushes 30. Three nozzles are selected in this embodiment because that number will laterally cover the transverse width T of the brush bed BR. A larger or smaller number of nozzles may be employed. For example, two nozzles for a narrow bed or four nozzles for a wide bed could be connected up to the system.

The nozzles are slidably mounted on transverse pipes including an upper pipe 42 and a lower pipe 44. The outer ends of both pipes are capped at 43 and 45 and are supported in a frame channel plate 46 (FIGS. 4 and 5). The inner ends of the pipes 42,44 are supported by pipe crosses assembled to form nozzle supply manifolds. The upper pipe 42 extends from a pipe cross 48 which is connected by a close nipple to a pipe cross 50. The pipe cross 50 is supported by a frame channel plate 52 and has an elbow 54 which connects to the wax line WL that supplies liquid under pressure to the pipe crosses 50 and 48 for delivery to the nozzles.

The conduits from the pipe crosses 48 and 50 to the nozzles are best seen in FIGS. 4, 5 and 6. In these Figures, it is assumed that three nozzles N3, N2 and N1 are to be active. The upper outlet of pipe cross 48 supplies liquid through an elbow to a wax conduit 56 for nozzle N3. The lower outlet of cross 48 supplies liquid to a conduit 58 for nozzle N2. The upper outlet of pipe cross 50 supplies liquid to a conduit 60 for nozzle N1 and the lower outlet (hidden), which could supply a fourth nozzle, is plugged.

In addition to receiving liquid under pressure, the nozzles can each receive air under pressure for clean out. Pressurized air is delivered to a lower pair of pipe crosses 70 and 68 connected together and to the lower nozzle support pipe 44. The pipe cross 70 is mounted on the channel plate 52 and has a fitting 74 for receiving air under pressure from a line 75, the air solenoid SV5 and the air line AL. The upper outlet of pipe cross 68 can supply air under pressure by a conduit 76 to the nozzle N3 and the lower outlet can supply air via conduit 78 to the nozzle N2. The upper outlet of cross 70 can supply air to the nozzle N1 via conduit 80 and since only three nozzles are in service the lower outlet is plugged at 82.

Nozzle Units

Each nozzle forms part of a nozzle unit U which serves several functions. All nozzle units are alike and only one need be described in detail. The nozzle unit supports a nozzle at a selected position, provides the liquid supply, mounts a solenoid liquid control valve and provides an air connection for clean out.

Unit U (FIGS. 4-7) includes a vertical mounting bracket 86 which is apertured to slidably receive the transverse mounting pipes 42,44 and which is secured to the pipes by set screws 42a,44a (FIG. 7). The bracket 86 has upper and lower ears 88,90 that are vertically apertured to slidably receive a vertical nozzle pipe 92. The pipe 92 is secured to the ears 88,90 in a selected vertical position by set screws 88a, 90a (FIG. 7).

The lower end of the nozzle pipe 92 connects to the inlet port of a valve element 94 (FIG. 5) forming part of a liquid control solenoid valve, such as valve SV3. The outlet portion of the valve element 94 connects by a close nipple 95 to a clean out pipe Tee 96 which mounts the nozzle N3. The solenoid element 98 of the liquid control valve SV3 contains the solenoid S3 (see FIG. 8) which solenoid is energized by a control lead 100 in a cable. Similar leads 101 and 102 in the cable energize the solenoid valves SV2 and SV1, respectively, in a three nozzle system.

The upper end of each vertical nozzle pipe 92 mounts an inlet elbow 104 (FIG. 5) for connection to one of the liquid lines 56,58 and 60, previously described. Each pipe Tee 96 mounts an inlet check valve 106 for connection to one of the air clean out lines 76,78 and 80, previously described. Thus, the nozzles are both transversely and vertically adjustable and are easily connected to the liquid and air lines required for operation. As mentioned, although three nozzles are employed in the installation just described, the system is readily adapted to accommodate the use of fewer or more nozzles, such as a number of nozzles ranging from 1-4, for example. In the system of the present invention the connection scheme for lines 56-60 and for lines 76-80 is not critical because the system is controlled electrically and not by conduit connections.

System Diagram

FIG. 8 is a simplified block diagram of a three nozzle system embodying the invention and showing the basic interconnection of the various elements of the system. The timing and duration of a pulse spray cycle for each nozzle is automatically controlled and a pulse spray signal is initiated by a microcomputer MC. The microcomputer executes a program based on various inputs, including switch settings and the computer provides properly timed outputs for the solenoid valves associated with the nozzles.

The control panel CP mounts five 2-pole, 4 position rotary switches R1-R5. These switches are manually set to provide respective switch settings NS, PS, ES, COS, FS and DS, which settings are inputs to the computer MC via a cable 16 (FIG. 3) and are converted into intermediate data N. PB, E, CO, FM and DM for controlling the spraying cycles of the system. These switch settings will be explained in detail presently and the nomenclature just mentioned is defined in the nomenclature table of FIG. 12.

In the system shown, the switches R, R2 and R3 (NS, PS and ES) are pre-set, usually at the factory, to match the installation for which the system is designed and these switches are mounted behind a panel door 106. The switches R4 and R5 (FS and DS) are set by an operator on the site, to refine the basic settings of switch R2 (PS), as will be described presently.

In addition to the settings for the input FS, the switch R4 has a clean out setting COS which initiates a timed nozzle clean out cycle CO when the switch is turned to its "clean out" position.

Spraying is automatically stopped and compressed air is blown through the nozzles to prevent nozzle clogging when the flow of fruit beneath the nozzles is interrupted for over two minutes. In the embodiment shown, the signal for this clean out operation originates upon opening of the normally open fruit switch 38. As seen in FIG. 8, when fruit F on the chute 36 closes the fruit switch 38, a signal in line 108 appears at normally open starting relay contacts NO for the feed conveyor 34. If the feed conveyor 34 is running, the contacts NO will be closed and the fruit switch signal is conducted by line 110 to a computer input/output I/O system. The I/O system relays the condition of the fruit switch via line 110a to the computer MC.

The microcomputer MC provides a number of control outputs via the I/O system. In the system shown in FIG. 8, provisions are made for the connection of up to four nozzles to the I/O, but only three nozzles N3, N2 and N1 are actually utilized. The computer MC is shown as having four output ports delivering signals P to the I/O. The signals P pass through modules OC1-OC5 of the I/O to a junction box JB, as will be described in connection with FIG. 10. The output signals P are produced sequentially and represents the pulse time during which the nozzle associated with a given output of the computer is turned on for spraying.

Outlet lines 100,101,102 from the junction box JB sequentially energize the respective solenoids S3,S2 and S1 of solenoid spray valves SV3,SV2 and SV1. Each valve is open for the duration of a pulse spray time P at a computer output port. FIG. 8 also shows diagrammatically how spray liquid such as wax, is pumped from the wax reservoir WR by the wax pump WP and delivered at a regulated pressure to the wax line WL and to a manifold formed by the pipe crosses 50,48, previously described. The wax conduits 56,58 and 60 for the nozzle N3,N2 and N1 are also shown in FIG. 8.

An air clean-out system is diagrammed in FIG. 8. The air line AL receives air under pressure and connects to the solenoid valve SV5. The line 75 from the air valve connects to an air manifold formed by the pipe crosses 70,68, previously described. The air lines 76,78 and 80 lead from the air manifold to the Tee's 96 for the nozzles N3, N2 and N1. The solenoid S5 is energized by line 112 from the OC5 module of I/O via the junction box JB in response to a clean out signal CO at an output port of the computer MC.

The system is powered by a power supply 118 and AC lines 119,119a controlled by an off-on switch SW.

Simplified Wiring Diagram

The highly simplified wiring diagram of FIG. 9 illustrates the inputs from the rotary switches and from the fruit switch to a parallel input-output circuit PIO of the computer MC. FIG. 9 also shows the outputs from PIC to the external input-output system I/O, and on to the solenoid valves. Each of the rotary switches is a two-pole or two-gang switch and is connected by a line 116 to a +5 volt power supply 118 and to ground. One section of each switch supplies the least significant bit lsb of a two significant bit binary word. The other switch section supplies the next significant bit msb of the same two significant bit word. The two output bits from each switch represent an address to memory in the computer MC wherein the corresponding data are stored.

The switch R1 can be set to any of four positions. Each position provides a two significant binary word indicated in FIG. 9 as setting NS. The binary data stored in computer memory at the address setting NS represents the corresponding number of nozzles N in the system. The corresponding decimal numbers for such data are from 1 to 4 in FIG. 9, although the computer memory could be programmed to assign the equivalent decimal numbers for 1–4 nozzles to the same binary numbers addressed by the switch settings NS. When the microcomputer MC receives the binary word setting NS from the switch R1 it fetches the corresponding number N from program memory. The number N is three nozzles in the example being described in detail.

A pulse time setting PS originates from the setting of switch R2 at the factory. The setting PS is also any one of four, two bit binary words which address the computer memory and retrieve any one of four pulse time bases PB stored in computer memory. The pulse time bases in the example given are decimal 8, 9, 10 or 11 milliseconds. As indicated in the nomenclature table of FIG. 12, the pulse time base PB is multiplied by two operator-selected multipliers, FM and DM, to provide a pulse time P in milliseconds. It is the latter time which is actually employed as a control for the nozzles.

The four position switch R3 is preset to provide an excursion time setting ES. The setting ES is any one of four, two significant bit binary words which will address computer memory and fetch the corresponding excursion time E programmed therein. In the example given, four excursion times E are stored in memory as binary words. These times are decimal 1.5, 1.25, 1.00 and 0.75 seconds. The corresponding excursion times E in milliseconds are 1500, 1250, 1000 and 750, decimal. As defined in the nomenclature table of FIG. 12, the selected excursion time E is the cycle time for one set of nozzles. Stated differently, E represents the time that elapses between successive initiations of spraying of a given nozzle. During this time all three nozzles of a set will have completed an individual spray or pulse cycle.

Switch R4 is a dual function, four position switch which can be set to provide any one of two bit (lsb and msb) binary words. Switch position No. 1 provides a two bit word which represents nozzle clean out setting COS. This setting is stored in the computer memory as a clean out instruction CO.

Switch R5 is a two-pole switch wherein only three positions are employed. Switch R5 can provide any one of three two bit binary words to form the density time setting DS. The setting DS addresses computer memory which contains corresponding density multipliers DM which can be X2, X4 or X7, decimal. As is seen in FIG. 12, the selected multiplier DM is employed in the computation of pulse time P by the computer.

The condition of the fruit switch 38 is another input to the computer via line 110, previously described. Since the fruit switch is in a 120 volt AC line its output of 120 volts AC or 0 volts is converted to +5 volts DC or 0 volts by a module IC1 plugged into a base module BM of the input-output system I/O, previously mentioned. The output of module IC1 is connected to the PIO of the computer by line 110a, previously described, for initiation of a timer cycle when no fruit is present and possibly a nozzle clean out cycle after a short time delay.

In the system shown, several sequential PIO outputs P of the computer can be connected to control the operation of solenoid valves for the nozzles, although only three such outputs are employed in the example described. In the three nozzle example, the computer opens and closes each solenoid valve by sequentially providing nozzle "on" signals via output lines P3,P2 and P1 (FIG. 9) during the computed pulse time P. As mentioned, all three pulse time signals on lines P3,P2 or P1 are completed during an excursion time E.

The computer outputs P3,P2 and P1 are connected to I/O modules OC3,0C2 and OC1, which modules convert DC computer signals to 120 volt AC signals. These AC signals are indicated by lines 100-102 and sequentially open the solenoid valves SV3,SV2 and SV1 for nozzles N3,N2 and N1 in response to the computer pulse time signals P3,P2 and P1.

If switch R4 is set to position No. 1 for a clean out signal COS, the computer delivers a DC clean out signal CO to the I/O system module OC5. This signal is converted to 120 volts AC on line 112 to operate the solenoid valve SV5 for the compressed air supply line AL, previously described. Before the clean out signal CO is delivered, the computer will have closed all solenoid valves for a nozzle which may have been opened for spraying.

As mentioned, a clean out signal CO can also be sent from the computer to the I/O system module OC5 in response to a signal from the fruit switch 38 indicating that no fruit has been present on the feed chute 36 (FIGS. 3 and 8) after the elapse of a predetermined time delay.

Exemplary Wiring Diagram

FIG. 10 is a system wiring diagram which illustrates preferred examples of selected system components.

The four switches R1-R5 are preferably two-pole, four contact, ganged rotary switches, although as shown, switch R5 employs only three of its four contacts for each pole. The contacts of each pole are connected to either a +5 volt line 116 or to ground, in patterns shown in FIG. 10. The contactor of each pole is connected to the computer and supplies one of the bits for an eight bit input port "B" of the computer PIO. The port "B" addresses computer memory.

In the example shown, switch R1 can select from 1-4 nozzles at switch positions 1-4, respectively. The least significant bit or lsb (upper bit in FIG. 10) contactor provides the least significant or "zero" position bit of the two bit binary word output setting NS of switch R1. The lower contactor provides the next most significant msb or the "one" position bit of the same two bit word. Specifically, and as readily ascertainable from the drawing, the binary word outputs NS of switch R1 for the positions 1-4 are 00,01,10 or 11, respectively.

The parallel input-output unit PIO has an eight bit port A having terminals DA0-DA7 and a port B that can receive an eight bit word at terminals DB0-DB7.

The lsb contactor of switch R1 is connected to terminal DA6 of the PIO of the computer MC. Thus, the switch R1 supplies the bit for position No. 6 in the eight bit binary word formed at the port A of the PIO. The msb contactor of switch R1 is connected to terminal DA7 and thus supplies the bit for position No. 7 in the eight bit binary word formed at the port A of the PIO. The connections of the contactors of the other switches R2-R5 to the PIO unit of the computer appear in FIG. 10 and need not be explained in detail.

Determination of N and Other Data

The computer MC which controls the system of the present invention is programmed to determine the number of nozzles N from a switch setting NS. In the embodiment described herein the computer is a microcomputer which includes the parallel input-output unit PIO previously described, a central processing unit in the form of an integrated circuit microprocessor, ROM, RAM and PROM memory units, a clock and other components, as known in the microcomputer art. Such microcomputers are commercially available as assembled board units and their components need not be described in detail to those skilled in the electronic control art. The computer is programmed to successively scan the binary number address settings at ports A and B of the PIO, obtain the data written into RAM at the respective addresses, and load the data into a register for computation. For example, if the switch setting of R1 is position No. 3, the binary address setting word NS will be 10 so that the bits at terminals DA6 and DA7 of port A of the PIO will be 0 and 1, respectively. The computer memory will have been programmed to store a binary number 11 (decimal 3) at the memory address selected by the computer program in response to the input (NS) set into DA6 and DA7 of the PIO by switch R. The number N thus obtained, represents the selected number of nozzles, and is saved for use, as called for during execution of the computer program.

The switch input program which determines N for switch settings NS also scans the other switch settings PS, ES, etc. and saves the corresponding excursion time E (1.5, 1.25, 1.00 or 0.75 sec.), the pulse base time PB, (8, 9, 10 or 11 MS), the fruit time multiplier FM (x4, x5 or x6) and the density time multiplier DM (x2, x4 or x7). If the switch R4 is set to its number 1 position representing the clean out setting COS, the resultant input 00 to ports DB4 and DB5 of the PIO represent a memory address which contains a nozzle clean out instruction for the computer.

Computer Outputs

As seen in FIG. 10, the outputs of the computer MC appear at terminal positions DA0-DA4 of the port A of the PIO. In a three nozzle installation, the fourth terminal (DA3) would not be connected, as indicated by the dotted lines, or if connected, the corresponding module OC4 would not be plugged into BM1. The computer output terminals provide inputs to input terminals 3, 5, 7 and 9 of the input-output system I/O, previously described.

The solenoids S1-S3 and S5 for the solenoid valves SV1-SV3 and SV5 are connected across one side 119 of the AC power line and the output terminals 2, 4, 6 and 8 of the input-output system I/O. The other AC line 119a is connected to the output terminals 3, 5, 7 and 9 of the I/O system, as shown in FIG. 10.

The input-output unit I/O is preferably an optical coupler system, there being an optical coupler module for each computer output signal, as well as for the AC signal from the fruit switch 38, which represents an input signal to the computer. The optical coupler system I/O shown in FIG. 10 includes two base modules BM1 and BM2. The base module BM1 mounts four plug-in DC input AC output optical coupling modules OC1-OC4 for controlling solenoids S1-S4, respectively.

The base module BM2 is only partially utilized and mounts one DC input coupling module OC5 for the solenoid S5 and an AC input DC output module IC1 for receiving signals from the fruit switch 38.

The base modules BM1 and BM2 and the coupling modules OC1-OC5 and IC1 are sold in the trade and need not be described in detail.

The odd terminal numbers 1-9 on the right side of each base module in FIG. 10 are DC terminals and on the left side are AC terminals. The terminal numbering system shown is that of the manufacturer, the Opto 22 Corporation of Huntington Beach, Calif. The system is sold in the trade as an Opto 22 Microprocessor System. The +5 volt line and the ground line from the power supply 118 are also connected to various terminals of the I/O, as shown in FIG. 10.

As indicated schematically in FIG. 10, each of the modules, such as module OC1, includes a circuit L that embodies a light emitting diode (not shown) controlled by a computer output, such as +5 volts to 0 volts. The module OC1 also includes a photo transistor gate circuit G.

The light emitting diode in circuit L is turned on by a transistor circuit upon receiving a signal at terminal 3 from port DA0 of the computer. Light from circuit L is received by the phototransistor in gate circuit G and the gate circuit connects one side of the associated solenoid S1 to the AC power line 119a. This opens the solenoid valve SV1 for spraying. After elapse of the pulse time P, the signal at the computer terminal returns to +5 volts, extinguishing the LED in circuit L of OC1, opening gate circuit G and deenergizing solenoid S1. The other DC input AC output modules OC2-OC5 have the same mode of operation as that of OC1, just described.

Module IC1 for the fruit switch 38 is an AC input, DC output module. As seen in FIG. 10 the fruit switch connects the AC line to a light circuit L' which controls a gate circuit G' and thus provides a signal to terminal DA5 of the computer. When the fruit switch 38 opens, indicating that no fruit is present on the input chute 36 (FIGS. 3 and 8), the light emitting diode in the light circuit L' is turned on thereby operating the gate circuit G'. This provides a signal to terminal DA5 of the computer for starting the timer that controls the initiation of a no-fruit clean out cycle.

The microcomputer whose terminals are illustrated in FIG. 10 is a John Bell Engineering Z80 microcomputer, sold by the John Bell Engineering, Inc. of Redwood City, Calif. This computer incorporates a Z80 microprocessor and a Z80 parallel input PIO unit manufactured by Zilog Inc. of Los Altos, Calif. The additional numbers applied to the computer terminal connections DA0-DB7 are the numbers of socket connections assigned to a 25 pin edge connector wired to the computer.

Timing Diagram

FIG. 11 is an illustrative block timing diagram showing a pulse time P, a dwell time D and an excursion time E. Dimensions along the path of fruit motion in FIG. 11 represent an elapsed time and do not represent conveyor travel during an elapsed time, as do the spray pattern diagrams of FIG. 2.

FIG. 11 illustrates the "time foot print" that each nozzle could produce if the nozzle were open during the entire dwell time D. Each "time foot print" is shaded to indicate the duration of the pulse time P, of the actual spraying cycle for each nozzle. Small circles and small crosses indicate the respective on and off signals to the nozzles and N3,N2 and N1.

As can be seen in FIG. 11, in a three nozzle system the excursion time E for one spray cycle of all three nozzles equals the sum of three dwell times D, that is, dwell time $D = E/N$ milliseconds. As mentioned, the excursion time E is obtained from the setting ES of switch R3 (FIG. 9).

The pulse diagram of FIG 11A presents the information of FIG. 11 in a more conventional manner. FIG. 11A illustrates the pulse time pulses P for each nozzle and the computed dwell times D for the same nozzle. If the switches R2,R4 and R5 (FIG. 9) are set to cause the computer to compute a pulse time P that exceeds the allotted dwell time D, the computer turns off each nozzle upon elapse of the allotted dwell time for that nozzle, thereby truncating the selected pulse time.

Nomenclature Table

FIG. 12 presents a Nomenclature Table which has been mentioned previously, and which includes brief definitions of various quantities relating to the operation of the system of the present invention.

The "Basic Data" column defines four basic physical quantities which must be considered in operating the system.

The "Switch Settings" column labels the settings from each rotary switch R1-R5 which form inputs to the computer, as described in connection with FIGS. 8 and 9.

The "Data From Settings" column defines the data derived by the computer directly from the switch settings.

The "Computed From Data" column of FIG. 12 defines pulse time P and dwell time D, these being computed times based on switch settings.

The "For Illustration" column defines the distances the fruit travel during the computed times E and P. These distances assist in illustrating examples of system operation.

FIG. 12 also illustrates an example of a nozzle N spraying a fruit F and illustrates values set forth in a "Data Example" column.

Pattern Example

FIG. 13 is a "spray foot print" pattern like that of FIG. 2 and illustrates a pattern example employing terminology defined in the nomenclature table of FIG. 12. FIG. 13A is a diagram illustrating various times which correspond to distances shown in FIG. 13.

In the example of FIGS. 13 and 13A, it is assumed that the pulse time P is at its maximum, wherein the pulse time equals the dwell time D. The spray patterns 20a,20b and 20c from nozzles N3,N2 and N1 provide interfitting and contiguous staggered band deposits 22, 22a,22b, etc. The patterns each have a longitudinal dimension or width equal to the distance VE through which the sprayed surface 10, (e.g. fruit) travels at the conveyor velocity V during the selected excursion time E. The ideal conditions are shown wherein the longitudinal dimension VE of each pattern equals W plus VP, namely, the sum of the longitudinal width W of a nozzle spray pattern on a fixed surface plus the distance VP during which the surface 10 travels during the nozzle pulse spray time P. The small dotted circles in each pattern indicate nozzle position relative to its pattern at the time when the nozzle is turned on and the small crosses indicate nozzle position at turn off.

In the accompanying timing diagram of FIG. 13A, the short solid lines indicate pulse times P and the vertical broken lines represent the sequencing of spray signals in the nozzle sequence N3,N2,N1 and back to N3 during the excursion time E (lower horizontal line).

Specific Example

FIG. 14 provides a specific data example and a different type of spray pattern diagram incorporating the data. FIG. 14 also provides an example of the computation of pulse time P. The data example table is self explanatory. The excursion time E, which ideally equals the quotient Fd/V is one second or 100 milliseconds. In a 3 nozzle system, the dwell time D is one-third the excursion time E and hence the pulse time P can equal but cannot exceed a dwell time D of 333 milliseconds.

The diagram of FIG. 14 represents the spray pattern example of FIG. 13 foreshortened, as if viewed edgewise. An excursion cycle starts with spraying by nozzle N3 of a pattern having a width W during a pulse time P to provide VP, the fruit travel during pulse time P. Nozzle N3 provides the spray pattern 20a. After elapse of dwell time D (which equals the pulse time P in this example) nozzle N2 is turned on and deposits the second pattern 20b. Nozzle N1 then deposits the third pattern 20c and upon completion of pattern 20c control shifts back to nozzle N3 for spraying a new pattern 20a. Various dimensional quantities listed in the specific data example are designated in the diagram of FIG. 14.

Below the diagram of FIG. 14 is a condensed presentation of the computation of pulse spray time P by the computer, based on values derived from the switch settings.

The excursion time E is derived from the switch setting ES and equals 1000 milliseconds. This means that the dwell time D equals E/3 or 333 milliseconds. The pulse base time PB is partially derived from the switch setting PS which equals 8 MS. The operator sets in the fruit and density time settings FS,DS from which the fruit and density multipliers FM,DM are also derived.

The pulse time P is computed as the product of PB,FM and DM which is $8 \times 6 \times 7$ or 336 MS. However, since P cannot exceed the computed dwell time D of 333 MS, the computer automatically truncates the computed value of 336 MP to 333 MS. This means that the computer will turn off each nozzle after elapse of the 333 MS dwell time D and switch to the next nozzle, regardless of its computation of somewhat longer pulse time P. However, the few milliseconds difference between these times will not significantly affect the spray pattern.

Alternative Spray Sequence

FIGS. 14A, 14B and 14C are presented together for illustrating the fact that for a given nozzle spraying sequence, such as the sequence N3-N2-N1-N3, etc. previously described, the positions of the nozzles in the row are not material.

FIG. 14A shows the spray patterns 20a,20b and 20c for the nozzle sequence N3-N2-N1 with the nozzles positioned as in FIGS. 13 and 14 and with an excursion cycle starting with nozzle N3. The circled numbers 1,2, 3, indicate the spraying sequence that produces a staggered band 22a and the sequence numbers 4,5 and 6 produce the staggered band 22b.

FIG. 14B shows the spray pattern when the excursion spray cycle starts at nozzle N3 but with nozzle N3 disposed in the middle of the row. Although the staggered band 23a produced by the sequence of FIG. 14B differs from the band 22c of FIG. 14A, since successive bands 23b,23c, etc. interfit, this is immaterial.

FIG. 14C shows still another spray pattern with another set of nozzle positions producing interfitting staggered bands 24a,24b etc. The diagrams of FIGS. 14A–14C illustrate spray patterns deposited when sequencing the nozzles in one direction. A flipped over set of patterns will be provided if the nozzles were sequenced in the opposite direction. The nozzles in all of such patterns are considered to be a "row" of nozzles as defined in the appended claims and produce interfitting staggered bands across the sprayed surface.

By way of example, the spray nozzles employed are sold under the trade name of V-Jet by Spraying Systems of Wheaton, Ill. The model number is H-18V9504 and the orifice diameter is 0.052". The pressure in wax line is about 40 psig with a flow rate of about 0.27 gal./min. The solenoid valves are manufactured by Asco of Forham Park, N.J. - Model No. 8262C2.

Program Flow Chart

FIGS. 15A and 15B taken together represent a program flow chart showing the sequence of the major instructions carried out by a microcomputer that has been programmed to control the nozzles in the system of the present invention. Based on the key instructions specifically set out in FIGS. 15A and 15B and on the descriptions of FIGS. 2–14, a computer programmer having ordinary skill in the art and having the instructions set for a selected microcomputer and microprocessor, can provide a step-by-step program and any step-by-step subroutine programs which are required to control and operate a spray system in accordance with the basic mode of operation previously described.

As part of the program, various items of data are written at selected addresses directly into a computer memory, such as a PROM. The data is stored as binary numbers for retrieval as called for during execution of the computer program. The data thus stored include the number N of nozzles available for selection by setting switch R1, such as 1–4 (decimal). Other stored data include the pulse base times PB available for selection by switch R2; the available excursion times E (switch R3); the available fruit miltipliers FM (switch R4) and the available density multipliers DM (switch R5).

Referring to the flow chart of FIG. 15A, after "Start" the first block 120 refers to various operations that are performed to "initialize" the system before the core program and the sub-routine steps are executed. The initialization process includes turning on the power, setting the various switches for computer inputs; the resetting of counters such as a "no fruit" counter and a ten second clean out counter to their start-count positions; insuring that all spray nozzles are turned off; etc. The counters are preferably reset automatically when the computer is powered up. In addition, the operator should turn switch R2 to the "clean out" position and activate the air solenoid S5 for a ten second clean out cycle, whereupon the computer MC is ready to start an excursion cycle. A programmed spray or excursion cycle starts at a connector point 122 such as an AND gate, indicated by the circled letter A in FIG. 15A, which gate passes instructions via line 123 to a block 124.

As summarized in block 124 of FIG. 15A, the computer is programmed to input and store operator switch settings. The computer scans the PIO inputs (FIG. 10) and reads the switch settings for the number of nozzles (NS), the pulse time setting (PS), the excursion time setting (ES), the fruit multiplier setting (FS) and the density multiplier setting (DS). These switch settings represent the addresses of corresponding data (N,PB,E, FM, and DM) previously entered and stored as a data memory table in PROM. The computer reads the data stored at the designated addresses in PROM and shifts the data to RAM for immediate subsequent use during execution of the program or cycle.

Clean Out Setting

The next step in the cycle is represented by a "decision" step or status flag indicated by the diamond 126. The computer is programmed to check the setting of switch R4 for a "clean-out" setting before continuing the cycle. If "clean out" has been selected at R4 (switch position No. 1) the decision at 126 is "yes". The computer output terminal DA4 (FIG. 10) now activates the air solenoid S5 (FIGS. 5 and 8), as indicated by box 128 of FIG. 15A. This connects the air line AL to all nozzles for clean out as long as switch R4 is left at its clean out position. The computer is programmed to loop back to point A as indicated by line 130 and hence returns to decision step 126. In so doing, the computer checks the position of switch R4 (box 124) hundreds of times each second and provides a clean out signal until "clean out" is no longer selected at that switch.

If switch R4 had not been set to its "clean out" position, or if it had been set to that position and had then been turned to an FS position, the output at decision step 126 would be "no", as indicated in the flow chart of FIG. 15A. In response to the "no" decision, the computer is programmed to check for the presence of fruit at switch 38. The condition of switch 38 (on or off) determines the output at decision step or status flag 132 in FIG. 15A.

No Fruit Clean Out

If the fruit switch indicates that no fruit is present at inlet chute 36 (FIG. 3) the decision at step 132 will be "no", which decision calls up subroutines in the program provided to prevent congealing of liquid in the nozzles during interruption of fruit supply to the sprayer.

Before tracing through the "no fruit" clean out subroutine reference will be made to the selection of some time delay periods that are incorporated in the computer program. First, it was arbitrarily decided not to execute a clean-out sub-routine for a fruit feed interrupt (no fruit) time of less than 500 milliseconds. Thus, in the system example described, the computer is programmed to check the condition of the fruit switch at 500 millisecond intervals, not at computer clock pulse intervals. Second, it was decided to have the computer check the condition of the fruit switch (at 500 millisecond intervals) over an arbitrarily selected delay period such as two minutes, before initiating a clean out cycle. The delay period during which no fruit is present could result from a conveyor line shut down for a lunch period, repair, etc., which delay if continued, would be of sufficient duration to permit congealing of liquid in the nozzles.

Thus, the computer program includes a "no fruit" counter routine which provides a selected time delay period of two minutes, during which a clean out signal is not provided by the computer even if fruit is not present at the fruit switch. The computer is programmed to maintain a clean out signal, when provided, of ten seconds.

Referring to the flow chart of FIG. 15A, when no fruit is present at the fruit switch 38, the output at the decision step 132 is "no". This, as indicated in box 134 of FIG. 15A, calls up a 500 millisecond time delay subroutine. This sub-routine employs the known time delay loop technique wherein the program status is saved while a programmed number of loop steps (not illustrated) is effected. The product of the time required to execute one loop step and the programmed number of loops provides the selected time delay, e.g., 500 milliseconds in the present example.

As indicated in box 134 of FIG. 15A, after a 500 millisecond time delay period has elapsed the computer decrements the "no fruit" counter. The computer then checks to see if the "no fruit" counter has reached zero, as indicated by the decision step 136. If the counter has not reached zero the output at step 136 is "no" and the program loops back to junction point A as indicated by line 130. The program now repeats execution of steps 124, 126 and 132 and repeats the 500 millisecond time delay and the "no fruit" counter decrementing routines. This decrementing loop of the no fruit counter is repeated (so long as no fruit is present at switch 38) for the programmed number of times, which number of times takes the preselected time delay period of two minutes.

After elapse of the two minute delay period, the "no fruit" counter will have been decremented to reach zero and the output decision step 136 will now be "yes", thereby proceeding to the next or succeeding step in the clean out sub-routine.

As indicated by a succeeding decision step 138 in FIG. 15A, before initiating a ten second clean out signal in response to a "yes" from decision step 136, the computer is programmed to perform an internal check to see if a ten second clean out signal has been run within the preceding two minutes. If the decision from step 138 is "yes" the program loops back via line 130 to junction point A without activating the air solenoid S5 for a ten second clean out. The decision step 138 precludes unnecessary re-activation of the air solenoid S5.

If no ten second clean out has been run, the decision at step 138 will be "no" with which the computer is programmed to carry out the steps in box 140, namely, to activate air solenoid S5 for ten seconds, thereby cleaning out the nozzles. After an elapse of the resulting ten second clean output period, as determined by another timing loop, the program returns to junction point A and re-executes the steps of box 124 and the decision steps 126 and 132 in the manner just described, but only so long as no fruit is present at the fruit switch 38. However, even if no fruit is present, the "yes" decision that is now provided at sub-routine step 138 precludes the activation of a solenoid S5 as called for in box 140.

Calculate Times

When fruit is present at switch 38, the decision at the "is fruit present?" step 132 of FIG. 15A is "yes" and the computer proceeds to execute the main program steps indicated in box 142. The computer first resets the "no fruit" and the "clean out" counters or timers to their initial (high) values from which they are to be decremented.

Next, the computer calculates two control times using stored data table values at addresses corresponding to the current switch settings. The dwell time D is calculated by fetching the selected excursion time E from the data table in memory and dividing it by the selected number N of nozzles, also obtained from the data table.

The pulse time P, during which a nozzle should spray, is calculated as the product of three switch setting data values stored in the data table. As previously explained and as indicated in box 142 of FIG. 15A, the pulse time P equals the product of PB the selected pulse base time, FM the selected fruit multiplier and DM the selected density multiplier.

Next, as indicated in the "Set Counters" program box 144 of FIG. 15A, having determined the selected number N of nozzles and having calculated the two times P and D in milliseconds, the computer sets the corresponding three counters at their initial or highest value, for subsequent decrementing during execution of the remaining portion of the first complete program cycle. The computer includes a nozzle counter which is set to the selected value N of the number of nozzles, a pulse counter which is set to the computed pulse time P and a dwell counter which is set to the computed dwell time D. The computer is now ready to provide nozzle spray instructions.

Spray Instructions

As seen at the bottom of FIG. 15A and at the top of FIG. 15B, the program proceeds to a junction point 146, such as an AND gate, indicated by the circled letter B. At the proper time, a "Spray next nozzle" instruction will be automatically looped back to the B junction point 146 by an instruction loop indicated by a line 147. The development of the "Spray next nozzle" loop instruction in line 147 for the B junction or gate 146 will be explained presently, it being noted that the loop 147 includes "reset" instructions 148 for resetting the dwell and pulse counters to their initial or highest values. When the "Spray next nozzle" instruction is received at gate B the computer proceeds with the program via flow chart line 150, based on data present in the nozzle, pulse and dwell counters. The remainder of this explanation of the program flow chart will be presented in conjunction with reference to actual nozzle numbers that are activated in a cycle.

It will be assumed for purposes of explanation that an excursion cycle E has just been completed, meaning that nozzles N3, N2 and N1 have sprayed in that order. After the last nozzle N1 stopped spraying, a "Start a new excursion cycle" instruction was received from line 180 at gate A (FIG. 15A). Assuming that no clean out is selected at R4 and that fruit is present at the fruit switch 38, the pulse and dwell counters are reset and the corresponding times are calculated. The nozzle counter is reset to its highest (selected) value, namely 3 in the three nozzle example being described, as explained in connection with the flow chart down through box 144 and on to gate B (146).

Now, when a "Spray next nozzle" instruction is received from loop line 147 at gate B, it is passed on by line 150 and the computer executes the instruction shown in box 152 of the flow chart. The computer scans the nozzle counter output and determines the nozzle number to which the counter has been set. Since, in the example being described, the last nozzle in a row is nozzle No. 1 and this nozzle has just completed its spraying cycle, the nozzle counter will have been reset (flow chart box 144) to nozzle No. 3. Thus, the instruction in box 152, which is "Open nozzle to which the nozzle counter is set" will initiate spraying of nozzle No. 3, the first nozzle to spray in the row of nozzles. This operation is illustrated diagrammatically in FIGS. 13, 13A and 14–14C.

As seen in FIG. 15B, the next step 154 in the program is a junction point or AND gate C. An instruction "Continue this nozzle" can be provided by a decision loop 156, depending upon the status of the pulse and dwell time counters, as will be described presently.

Assuming that a "Continue this nozzle" instruction is present on the decision loop 156, the computer program keeps the nozzle open for either the length of the pulse time P or for the length of the dwell time D in case the computed pulse time exceeds the completed dwell time. In the present example, (nozzle N3 opened) the receipt of a "Continue" instruction from line 156 calls up a 1 millisecond time delay sub-routine as indicated by the flow chart box 158.

The 1 millisecond time delay is merely an arbitrarily selected delay period which elapses between the times the computer scans the data in the pulse, dwell and nozzle counters and decrements those counters as required by the program. The 1 millisecond time delay is provided in a known fashion by a sub-routine time delay loop similar to the 500 millisecond time delay loop previously mentioned.

Continuing with the flow chart of FIG. 15B, after a 1 millisecond time delay and as indicated in box 160, the computer decrements the time counters simultaneously. The computer decrements the pulse counter to provide the remaining pulse time P and it decrements the dwell counter to provide the remaining dwell time D in terms of real time. After each decrement the computer first checks the status of the pulse counter, as indicated by decision step or status flag 162 in the flow chart. In effect, the computer asks "Has the pulse counter reached zero?" at decision step 162. If the pulse counter has not reached zero, the decision on output line 164 of decision step 162 will represent "no" which results in a "Continue this nozzle" instruction being returned to gate C via a decision step or status flag 166 (not yet described) as indicated by the decision loop line 156. The "Continue" decision is returned by loop 156 only if the dwell time D has not elapsed, that is only if the dwell counter has not reached zero. The flow of instructions takes a different path when the dwell counter reaches zero, as will be explained presently.

Assuming that the computed pulse time P does not exceed the computed dwell time D, the circulating "Continue this nozzle" instruction in loop 156 is repeated every millisecond until the pulse time P elapses for nozzle N3, whereupon the pulse counter reaches zero. When the pulse counter reaches zero, a "yes" decision is provided on a "yes" line 168 from decision step 162. As seen in the flow chart, the "yes" instruction calls up program step 170 which instructs the computer to "Close the nozzle to which the nozzle counter is set". In the example being described, the nozzle counter was set at nozzle N3 and hence the solenoid valve SV3 for nozzle N3 will now be closed by the instruction step 170. This instruction causes the voltage at computer output terminal DA2 (FIG. 10) to revert to its original or close nozzle condition.

Even though the pulse counter has reached zero so that the decision at status flag 162 relays the pulses every millisecond to the "yes" line 168 instead of to the "no" line 164, these pulses are passed on by a return line 172 from the "close nozzle" box 170 to the "no" line 164 and hence are passed on to the decision flag 166. Assuming that the dwell counter has not reached zero these pulses are circulated by the "Continue this nozzle" loop 156, as previously described until the dwell time has elapsed. However, since instruction 170 closed nozzle N3, the nozzle to which the nozzle counter was set, the circulating "Continue this nozzle" pulses in loop 156 cannot re-open the nozzle N3. These pulses merely continue to decrement the dwell counter each millisecond.

The program insures that ultimate control of the spray sequence remains with the dwell counter so that no individual nozzle can spray longer than the dwell time D. As explained, regardless of the pulse counter decision instruction at decision step 162, pulses appear every millisecond on line 164 as inputs for the succeeding decision step 166. Previously, it has been assumed that the dwell time D had not elapsed, so that although the dwell counter had been decremented along with the pulse counter upon each loop through the decrement step 60, the dwell counter had not reached zero. When the dwell counter has reached zero, it is time to open the next nozzle regardless of the condition of the pulse counter and the decision step or status flag 166 will now provide a "yes" output on line 173 to program block 174 in FIG. 15B. The computer is thereby instructed to "Decrement the nozzle counter" and hence to proceed to the next nozzle.

In the present example, the nozzle counter will be decremented from nozzle No. 3 to the next nozzle, nozzle No. 2. However, since the nozzle counter within the computer is not now zero but has merely been decremented to nozzle No. 2, the decision at the nozzle counter status flag 176 is "no". The "no" decision at status flag 176 directs a "Spray next nozzle" instruction along loop line 147. This instruction (along with a reset instruction for the pulse and dwell counters) is received at gate B and is passed on by line 150 to instruction box 152 in the flow chart. The computer now opens the nozzle to which the nozzle counter has been set and since the nozzle counter was decremented and set to nozzle No. 2 (box 174) an output signal appears at port DA1 (FIG. 10) of the computer which energizes valve solenoid S2 and opens nozzle valve SV2 for spraying.

As soon as nozzle No. 2 starts spraying, in accordance with the instruction in block 152 of the program, the computer again decrements the pulse and dwell counters (block 160) after each 1 millisecond time delay. If the pulse counter reaches zero before the dwell counter reaches zero, the resultant "yes" on line 168 from decision step 162 will close nozzle N2 and pulses circulate back through return 172 and around loop 156, as before.

When the dwell counter reaches zero again (step 166) the "yes" on line 173 instructs the computer to decrement the nozzle counter (step 174), with which the "Next nozzle" will be nozzle No. 1. The nozzle counter is not at zero (step 176) and hence a "no" or "Spray next nozzle" decision appears on line 147 and is directed back to gate B. Decrementing the nozzle counter from 2 to 1 turned off nozzle No. 2 and the instruction in flow chart box 152 opens nozzle No. 1 by a signal at the DA0 computer output, FIG. 10.

The one millisecond control pulses decrement the reset pulse and dwell counters again (box 160) and the decision loop steps previously described are repeated. However, a complete staggered band spray pattern, such as pattern 22b of FIG. 13, has now been produced and spraying should be resumed by nozzle No. 3. Thus since the nozzle counter is now at zero, the decision at step 176 of the flow chart is now a "yes" decision on the return line 180. As seen at the upper portion of FIG. 15A, the "yes" decision pulse developed on line 180, when the nozzle counter has been decremented to zero, is returned to gate A and starts a new excursion cycle like that just described in detail. Starting with the instructions in box 124 the program is re-executed and the computer first re-opens nozzle No. 3 by a signal at the DA2 computer output. (FIG. 10) As the program continues, another staggered band is layed down, such as band 22a of FIG. 13.

Thus, it can be seen that the spray system of the present invention is computer controlled, based on operator settings and that only one nozzle of a selected number of nozzles can spray at any one time. This permits the use of a single regulated pressure setting for the nozzle supply line. Spray nozzle control signals are instantaneously shifted from one nozzle solenoid value to the next to provide interfitting, staggered band spray patterns. The spray pattern density is uniform, wax loss is minimized and other features and advantages set forth previously are provided. The requirements of various field conditions are readily met by setting the switches R1–R5 and by positioning the selected number of nozzles along their supports 42,44 (FIG. 4). The nozzle can spray for a period of time which exceeds the maximum (dwell) time allotted to the individual nozzles.

The hook up of the conduit connections for the wax lines and the air lines is not critical, it only being necessary to correctly wire the solenoid valves to the junction box or its equivalent in accordance with the system program.

Having completed the detailed description of the preferred embodiment of the invention so that those skilled in the art may practice the same, I claim:

1. In the method of spray coating moving articles supplied in a continuous stream to a conveying device that continually rotates the articles while they are being fed along a path and are sprayed from fixed nozzles that overlay and are transversely spaced across the path, the improvement comprising the steps of spraying sequentially from said nozzles to form a spray pattern extending the full transverse extent of the conveyor and repeating the sequential spraying at intervals that produce a continuous coating on articles advancing through the spray pattern of the nozzles.

2. The method of claim 1; comprising the steps of sensing for the presence and for the absence of articles at a location on said path upstream of the nozzles and cleaning out said nozzles with fluid under pressure when sensing the absence of articles at said location.

3. The method of claim 2, comprising the steps of initiating a short time delay period upon sensing the absence of articles at said location and cleaning out said nozzles upon expiration of said time delay period.

4. In the method of spray coating moving surfaces with a liquid from a set of fixed nozzles that are transversely spaced across and above the moving surface; the improvement comprising the steps of sequentially pulse spraying from each nozzle in the set during an excursion cycle to deposit a staggered band coating extending across the moving surfaces and repeating said excursion cycles to deposit successive staggered band coatings and timing the duration of the pulse spraying periods of each nozzle to render adjacent staggered band deposits contiguous and interfitting.

5. The method of coating longitudinally moving articles with a liquid comprising the steps of sequentially depositing a plurality of transversely extending individual spray patterns of substantially uniform longitudinal dimension on the moving articles, said spray patterns joining end to end to form a staggered band extending transversely across the articles, forming said band during an excursion spray cycle and successively repeating said excursion spray cycle, the duration of said excursion spray cycle being substantially equal to the time required for the articles to move a longitudinal distance that equals the longitudinal dimension of an individual spray pattern.

6. The method of spray coating longitudinally moving surfaces from a transverse row of fixed nozzles comprising the steps of selecting an excursion time during which all nozzles in the row will spray once, dividing said excursion time by the number of nozzles in the row to produce a dwell time for each nozzle and activating the nozzles in a row sequentially during a pulse spray time for each nozzle that does not exceed said dwell time.

7. A method of spray coating longitudinally moving surfaces with a liquid comprising the steps of selecting an excursion time, sequentially pulsing each nozzle in a transverse row of fixed nozzles for depositing an individual spray pattern from each nozzle during said excursion time, forming a transversely extending staggered band deposit from said individual patterns of the row of nozzles during an excursion time, the time interval between the formation of successive individual patterns from each nozzle equaling the quotient of said excursion time and the number of nozzles in the row.

8. The method of claim 7 wherein said excursion time is substantially equal to the time required for the sprayed surface to move a distance equal to the longitudinal dimension of an individual pattern so that successive staggered band deposits are interfitting.

9. The method of spraying longitudinally moving articles from a selected number of fixed nozzles disposed in a transverse row across and above the surface; said method comprising the steps of selecting an excursion time during which each nozzle in the row will spray a single time, determining a dwell time by taking the quotient of said excursion spray time and said number of nozzles, selecting a pulse spray time which does not exceed said dwell time and causing said nozzles to spray successively with each nozzle spraying once during said pulse spray time and with all of the nozzles in a row spraying once during said excursion spray time for providing successive spray patterns having a predetermined longitudinal dimension.

10. The method of claim 9 wherein said excursion spray time is substantially equal to the quotient of the longitudinal dimension of a spray pattern and the velocity of said moving surface.

11. A computer operated spray comprising means for advancing articles to be sprayed along a path, a row of fixed spray nozzles above said path, a remote control valve for each nozzle, a source of fluid under pressure for all nozzles; a programmed digital computer for controlling said valves, said computer having a memory for storing data as to various numbers of nozzles, various excursion times during which all nozzles are to spray once and various pulse times during which each nozzle is to spray once; means for setting selected data addresses into said computer; said computer having processing means for cyclically scanning said address settings and retrieving the corresponding stored data, said computer having output means for providing sequential valve control pulse spray signals in accordance with said retrieved data.

12. The spray system of claim 11 wherein said computer processing means comprises means for dividing the retrieved excursion time data by the retrieved data as to the number of nozzles to produce a dwell time and means for limiting the duration of each pulse spray signal to a time that is no greater than said dwell time.

13. The system of claim 11 comprising means for sensing the presence of articles along said path and means for cleaning out said nozzles with a pressurized fluid when no articles are sensed.

14. The system of claim 13 wherein said clean out means comprises a fluid manifold connected to all nozzles, a source of fluid under pressure for said manifold, remote control clean out valve means for said source and timing means in said computer for controlling said clean out valve means.

15. The spray system of claim 11 wherein each of said data setting means comprises a multi-contact tap switch having a movable contactor, a power source having two voltage outputs, means for connecting each switch contact to one of said voltage outputs, and means for connecting the contactor of each switch to an input port of said microcomputer for supplying binary data to the computer.

16. The spray system of claim 15 wherein said switch is a gang switch for supplying multi-bit binary data to the computer.

* * * * *